(12) United States Patent
Mudunuri et al.

(10) Patent No.: US 7,254,590 B2
(45) Date of Patent: Aug. 7, 2007

(54) SET-ORIENTED REAL-TIME DATA PROCESSING BASED ON TRANSACTION BOUNDARIES

(75) Inventors: Gautam H. Mudunuri, Union City, CA (US); Raymond G. To, Daly City, CA (US)

(73) Assignee: Informatica Corporation, Redwood City, CA (US)

( * ) Notice: Subject to any disclaimer, the term of this patent is extended or adjusted under 35 U.S.C. 154(b) by 545 days.

(21) Appl. No.: 10/727,700

(22) Filed: Dec. 3, 2003

(65) Prior Publication Data

US 2005/0125436 A1  Jun. 9, 2005

(51) Int. Cl.
*G06F 7/00* (2006.01)
*G06F 17/00* (2006.01)
*G06F 17/30* (2006.01)
*G06F 12/00* (2006.01)

(52) U.S. Cl. .................. 707/200; 707/101; 707/102
(58) Field of Classification Search ............ 707/2, 707/6, 7, 100, 102, 101, 200–204; 702/19; 709/201; 714/6, 20
See application file for complete search history.

(56) References Cited

U.S. PATENT DOCUMENTS

| | | |
|---|---|---|
| 5,403,147 A | 4/1995 | Tanaka |
| 5,404,513 A | 4/1995 | Powers et al. |
| 5,405,531 A | 4/1995 | Hitzman et al. |
| 5,410,688 A | 4/1995 | Williams et al. |
| 5,420,688 A | 5/1995 | Farah |
| 5,455,945 A | 10/1995 | Vanderdrift |
| 5,511,190 A | 4/1996 | Sharma et al. |
| 5,519,859 A | 5/1996 | Grace |
| 5,537,589 A | 7/1996 | Dalal |
| 5,563,999 A | 10/1996 | Yaksich et al. |
| 5,603,024 A | 2/1997 | Goldring |
| 5,655,101 A | 8/1997 | O'Farrell et al. |
| 5,675,785 A | 10/1997 | Hall et al. |
| 5,689,566 A | 11/1997 | Nguyen |
| 5,692,181 A | 11/1997 | Anand et al. |

(Continued)

FOREIGN PATENT DOCUMENTS

EP  0987868 A3  3/2000

(Continued)

OTHER PUBLICATIONS

24X7 The Magazine of Nonstop Computing, "Compaq's Zero Latency Enterprise Initiative," vol. 1, No. 2, Oct. 2000, pp. 1-25.

(Continued)

*Primary Examiner*—Don Wong
*Assistant Examiner*—Merilyn Nguyen
(74) *Attorney, Agent, or Firm*—Fenwick & West LLP

(57) ABSTRACT

A method is provided for real-time data processing based on data sets or data sets defined by applicable rules or user-defined logic. Also provided is a real-time data processing system that implements such method. Transaction boundaries are set and propagated through cascades of multiple data transformations on multitudes of data records or rows. The method may be implemented in conjunction with a relational database management system (DBMS), object DBMS, or any other DBMS. The method and system for real-time data processing may be advantageously applied in Extract, Transform, and Load (ETL), Enterprise Application Integration (EAI), and Enterprise Information Integration (EII).

52 Claims, 19 Drawing Sheets

U.S. PATENT DOCUMENTS

| | | |
|---|---|---|
| 5,706,495 A | 1/1998 | Chadha et al. |
| 5,708,828 A | 1/1998 | Coleman |
| 5,713,020 A | 1/1998 | Reiter et al. |
| 5,721,903 A | 2/1998 | Anand et al. |
| 5,721,911 A | 2/1998 | Ha et al. |
| 5,734,818 A | 3/1998 | Kern et al. |
| 5,778,355 A | 7/1998 | Boyer et al. |
| 5,781,911 A | 7/1998 | Young et al. |
| 5,787,415 A | 7/1998 | Jacobson et al. |
| 5,794,030 A | 8/1998 | Morsi et al. |
| 5,794,228 A | 8/1998 | French et al. |
| 5,794,229 A | 8/1998 | French et al. |
| 5,794,246 A | 8/1998 | Sankaran et al. |
| 5,799,310 A | 8/1998 | Anderson et al. |
| 5,806,060 A | 9/1998 | Borgida et al. |
| 5,822,751 A | 10/1998 | Gray et al. |
| 5,826,258 A | 10/1998 | Gupta |
| 5,832,496 A | 11/1998 | Anand et al. |
| 5,842,213 A | 11/1998 | Odom et al. |
| 5,848,415 A | 12/1998 | Guck |
| 5,854,890 A | 12/1998 | Ramachandran et al. |
| 5,857,197 A | 1/1999 | Mullins |
| 5,870,746 A | 2/1999 | Knutson et al. |
| 5,870,747 A | 2/1999 | Sundaresam |
| 5,873,102 A | 2/1999 | Bridge, Jr. et al. |
| 5,884,262 A | 3/1999 | Wise et al. |
| 5,898,431 A | 4/1999 | Webster et al. |
| 5,915,019 A | 6/1999 | Ginter et al. |
| 5,933,796 A | 8/1999 | Ashida et al. |
| 5,982,890 A | 11/1999 | Akatsu |
| 5,987,454 A | 11/1999 | Hobbs |
| 5,991,742 A | 11/1999 | Tran |
| 6,002,402 A | 12/1999 | Schacher |
| 6,003,024 A | 12/1999 | Bair et al. |
| 6,014,670 A | 1/2000 | Zamanian et al. |
| 6,026,388 A | 2/2000 | Liddy et al. |
| 6,032,145 A | 2/2000 | Beall et al. |
| 6,032,158 A | 2/2000 | Mukhopadhyay et al. |
| 6,044,374 A | 3/2000 | Nesamoney et al. |
| 6,065,007 A | 5/2000 | Muthukrishanan et al. |
| 6,072,492 A | 6/2000 | Schagen et al. |
| 6,078,994 A | 6/2000 | Carey |
| 6,119,167 A | 9/2000 | Boyle et al. |
| 6,122,628 A | 9/2000 | Castelli et al. |
| 6,128,624 A | 10/2000 | Papierniak et al. |
| 6,141,699 A | 10/2000 | Luzzi et al. |
| 6,151,584 A | 11/2000 | Papierniak et al. |
| 6,151,601 A | 11/2000 | Papierniak et al. |
| 6,173,310 B1 | 1/2001 | Yost et al. |
| 6,192,364 B1 | 2/2001 | Baclawski |
| 6,205,472 B1 | 3/2001 | Gilmour |
| 6,208,990 B1 | 3/2001 | Suresh et al. |
| 6,216,125 B1 | 4/2001 | Johnson |
| 6,230,151 B1 * | 5/2001 | Agrawal et al. .............. 706/12 |
| 6,233,575 B1 | 5/2001 | Agrawal et al. |
| 6,262,598 B1 | 7/2001 | Cairns et al. |
| 6,269,336 B1 | 7/2001 | Ladd et al. |
| 6,269,369 B1 | 7/2001 | Robertson |
| 6,272,485 B1 | 8/2001 | Sragner |
| 6,272,598 B1 | 8/2001 | Arlitt et al. |
| 6,292,657 B1 | 9/2001 | Laursen et al. |
| 6,308,203 B1 | 10/2001 | Itabashi et al. |
| 6,330,568 B1 * | 12/2001 | Boothby et al. ............ 707/201 |
| 6,336,137 B1 | 1/2002 | Lee et al. |
| 6,339,775 B1 | 1/2002 | Zamanian et al. |
| 6,369,840 B1 | 4/2002 | Barnett et al. |
| 6,385,604 B1 | 5/2002 | Bakalash et al. |
| 6,393,386 B1 | 5/2002 | Zager et al. |
| 6,397,223 B1 * | 5/2002 | Kori ............ 707/102 |
| 6,404,884 B1 | 6/2002 | Marwell et al. |
| 6,408,292 B1 | 6/2002 | Bakalash et al. |
| 6,411,936 B1 | 6/2002 | Sanders |
| 6,418,200 B1 | 7/2002 | Ciccolella et al. |
| 6,421,781 B1 | 7/2002 | Fox et al. |
| 6,424,426 B1 | 7/2002 | Henry |
| 6,430,624 B1 | 8/2002 | Jamtgaard et al. |
| 6,438,522 B1 | 8/2002 | Minowa et al. |
| 6,438,552 B1 | 8/2002 | Tate |
| 6,446,059 B1 | 9/2002 | Berger et al. |
| 6,446,062 B1 | 9/2002 | Levine et al. |
| 6,446,096 B1 | 9/2002 | Holland et al. |
| 6,449,619 B1 | 9/2002 | Colliat et al. |
| 6,457,030 B1 | 9/2002 | Adams et al. |
| 6,466,969 B1 | 10/2002 | Bunney et al. |
| 6,477,525 B1 | 11/2002 | Bello et al. |
| 6,480,711 B1 | 11/2002 | Guedalia |
| 6,487,584 B1 | 11/2002 | Bunney |
| 6,493,800 B1 | 12/2002 | Blumrich |
| 6,502,101 B1 | 12/2002 | Verprauskus et al. |
| 6,526,335 B1 | 2/2003 | Treyz et al. |
| 6,535,872 B1 | 3/2003 | Castelli et al. |
| 6,539,359 B1 | 3/2003 | Ladd et al. |
| 6,549,910 B1 | 4/2003 | Tate |
| 6,549,937 B1 | 4/2003 | Auerbach et al. |
| 6,553,366 B1 | 4/2003 | Miller et al. |
| 6,563,912 B1 | 5/2003 | Dorfman et al. |
| 6,564,264 B1 | 5/2003 | Creswell et al. |
| 6,574,599 B1 | 6/2003 | Lim et al. |
| 6,581,062 B1 | 6/2003 | Draper et al. |
| 6,591,304 B1 | 7/2003 | Sitaraman et al. |
| 6,601,062 B1 | 7/2003 | Deshpande et al. |
| 6,616,701 B2 | 9/2003 | Doyle |
| 6,629,102 B1 | 9/2003 | Malloy et al. |
| 6,631,497 B1 | 10/2003 | Jamshidi et al. |
| 6,636,870 B2 | 10/2003 | Roccaforte |
| 6,671,689 B2 | 12/2003 | Papierniak |
| 6,721,728 B2 | 4/2004 | McGreevy |
| 7,024,401 B2 * | 4/2006 | Harper et al. .................. 707/2 |
| 2002/0035565 A1 | 3/2002 | Shah et al. |
| 2002/0056081 A1 | 5/2002 | Morley et al. |
| 2002/0059267 A1 | 5/2002 | Shah et al. |
| 2002/0077787 A1 | 6/2002 | Rappaport et al. |
| 2002/0099691 A1 | 7/2002 | Lore et al. |
| 2002/0112237 A1 | 8/2002 | Kelts |
| 2002/0161770 A1 | 10/2002 | Shapiro et al. |
| 2003/0083822 A2 * | 5/2003 | Brunner et al. ............... 702/19 |
| 2003/0172247 A1 | 9/2003 | Bayer et al. |
| 2004/0010538 A1 * | 1/2004 | Miller et al. ................ 709/201 |
| 2005/0192846 A1 * | 9/2005 | De Zwart et al. ............... 705/3 |

FOREIGN PATENT DOCUMENTS

| | | |
|---|---|---|
| EP | 1043671 A2 | 10/2000 |
| EP | 1164511 A2 | 12/2001 |
| GB | 2350758 | 12/2000 |
| GB | 2357596 | 6/2001 |
| WO | WO 99/24922 | 5/1999 |
| WO | WO 00/04466 | 1/2000 |
| WO | WO 00/08581 | 2/2000 |
| WO | WO 00/77707 | 12/2000 |
| WO | WO 01/18728 | 3/2001 |
| WO | WO 01/20438 | 3/2001 |
| WO | WO 01/24040 | 5/2001 |
| WO | WO 02/44953 | 6/2002 |

OTHER PUBLICATIONS

"A Process for Selective Routing of Servlet Transcoding Modules," IBM Technical Disclosure Bulletin, vol. 42, Issue 422, Jun. 1999 UK.

Multi-Modal Data Access Research Disclosure, Kenneth Mason Publications, Hampshire, GB, No. 426, Oct. 1999, pp. 133-1386.

"Parameterized XSL Style Sheets," Research Disclosure, vol. 42, No. 423, Jul. 1, 1999, Havant, UK, Article No. 423110.

Anand, V. J. et al. "Data Warehouse Architecture for DDS Applications." Australian Journal of Information Systems. Sep. 1996, AJIS Publishing, Australia, vol. 4, No. 1, pp. 43-53.

Ballinger, C. et al., "Born to be Parallel. Why Parallel Origins Give Teradata an Enduring Performance Edge," Bulletin of the Technical Committee on Data Engineering, vol. 20, No. 2, Jun. 1997, IEEE Comput. Soc., Los Alamitos, CA, US.

Barrett, R. et al., "Intermediaries: An Approach to Manipulating Information Streams," IBM Systems Journal, IBM Corp., Armonk, New York, U.S. vol. 38, No. 4, 1999, pp. 629-641.

Bellatreche, L. et al., "OLAP Query Processing for Partitioned Data Warehouses," Proceedings 1999 Int'l. Symposium on Database Applications in Non-Traditional Environments (Dante '99) (CAT. No. PR00496), Kyoto, JP, Nov. 28-30, 1999, pp. 35-42, IEEE Comput. Soc., Los Alamitos, CA US ISBN: 0-7695-0496-5.

Bello, R.G. et al., "Materialized Views in Oracle," Proceedings of the Int'l. Conf. On Very Large Data Bases, NY, Aug. 24, 1998, pp. 659-664.

Chamberlin, D. et al., "A Complete Guide to DB2 Universal Database," 1992, pp. 659-600.

Chan, R. "12 Steps of Creating a Successful Data Warehouse," Proceedings of the 8th International Database Workshop (Industrial Volume), Proceedings of the 8th International Hong Kong Computer Society Database Workhop, Data Mining, Data Warehousing and CLI, pp. 227-248, ISBN 981-3083-53-0, 1997, Singapore, Springer-Verlag Singapore, Singapore.

Chaudhuri, S. et al., "An Overview of Data Warehousing and OLAP Technology," SIGMOD Record, Sigmod, New York, No. US, vol. 2, No. 1, Mar. 1997, pp. 65-74.

Curley, K. et al. "The Rationale for Developing a Corporate Data Warehouse and the Development of a Model for Sharing Data in a Data Warehouse Environment." OOIS '95. 1995 International Conference on Object Oriented Information Systems Proceedings, Proceedings of 1995, International Conference on Object Oriented Information Systems, Dublin, Ireland, Dec. 18-20, 1995, pp. 351-366, Berlin, Germany, Springer-Verlag, Germany.

Datta, A., et al., "A Case for Parallelism in Data Warehousing and OLAP," Ninth Int'l. Workshop on Database and Expert Systems Applications, Vienna, AT, IEEE Comput. Soc., Los Alamitos, CA, US, Aug. 26, 1998, pp. 226-231.

Dawson, F. et al., RFC 2426 vCard MIME Directory Profile, Network Working Group, Request for Comments 2426, Sep. 1998.

Deutsch, A. et al., "Storing Semistructured Data with STORED," ACM SIGMOD Record, Proceedings of the 1999 ACM SIGMOD International Conference on Management of Data, Jun. 1999, vol. 28, Issue 2.

Duncan, K., et al., "Optimizing the Data Warehousing Environment for Change: the Persistent Staging Area," Cutter IT Journal, Jun. 1999, Cutter Inf. Corp. USA, vol. 12, No. 6, pp. 28-35.

Fernanez, M. et al., "SilkRoute: Trading Between Relations and XML," WWW9/Computer Networks, 33(1-6), pp. 723-745, 2000.

Florescu, D. et al., "A Performance Evaluation of Alternative Mapping Schemes for Storing SML in a Relational Database," Technic Report 3680, INRIA, 1999.

Freytag, C. et al., "Resource Adaptive WWW access for Mobile Applications," Computers and Graphics, Pergamon Press Ltd., Oxford, GB, vol. 23, No. 6, Dec. 1999, pp. 841-848.

Fry, J.P, "Conversion Technology, An Assessment," ACM SIGMIS Database, vol. 12-13, No. 4-1, Jul. 1981, pp. 39-61.

Hammer, J. et al., "Extracting Semistructured Information From the Web," Proceedings of the Workshop on Management of Semi-structured Data, Mar. 16, 1997, pp. 1-25.

Hori, M. et al., "Annotation-Based Web Content Transcoding," Computer Networks, Elsevier Science Publishers B.V., Amsterdam NL., vol. 33, No. 106, Jun. 2000, pp. 197-211.

Housel, B. et al., "A High-Level Data Manipulation Language for Hierarchical Data Structures," International Conference on Management of Data, 1976, pp. 155-169.

Informatica Press Releases, "Informatica Delivers Industry's First Synchronized Data Marts With Newest Version of Powermart Suite," <http://www.informatica.com/syndata_052798.html>, pp. 1-4, May 27, 1997.

Informatica Press Releases, "Informatica Unveils Architecture for Networking Multiple Data Marts Into an Enterprise-Wide Data Warehouse," <http://www.informatica.com/edm_082697.html>, pp. 1-4, Aug. 26, 1997.

Jaczynski, M. et al., "Broadway: A Case-Based System for Cooperative Information Browsing on the World Wide Web," Collaboration Between Human and Artificial Societies, Online 1999.

Jones, K., "An Introduction to Data Warehousing: What are the Implications for the Network," 1998, International Journal of Network Management, vol. 8, pp. 42-56.

Juhne, J., et al., "Ariadne: a Java-Based Guided Tour System for The World Wide Web," Computer Networks and ISDN Systems, North Holland Publishing, Amsterdam, NL, vol. 30, No. 107, Apr. 1, 1998, pp. 131-139.

Kim, W., "On Optimizing an SQL-Like Nested Query," ACM Transactions on Database Systems, Association for Computing Machinery, New York, US, vol. 7, No. 3, Sep. 1, 1982, pp. 443-469.

Kitayama, F. et al., "Design of a Framework for Dynamic Content Adaptation to Web-enabled Terminals and Enterprise Applications," Software Engineering Conference, 1999. Proceedings Sixth Asian Pacific Takamatsu, Japan, Dec. 7-10, 1999, Los Alamitos, CA, US.

Kovacs, L. et al., "Aqua: An Advanced User Interface for the Dienst Digital Library System," $8^{th}$ Delos Workshop: User Interfaces for Digital Libraries, Online, Oct. 21-23, 1998, Sweden, p. 2.

Lum, V. Y. et al., "A General Methodology for Data Conversion and Restructuring," IBM Journal of Research and Development, IBM Corporation, Armonk, US, vol. 20, No. 5, Sep. 1, 1976, pp. 483-497.

Makpangou, M. et al., "Replicated Directory Service for Weakly Consistent Distributed Caches, " INRIA SOR group-78143 Le Chesnay Cedex, France.

Mohania, M. et al.: "Advances and Research Directions in Data Warehousing Technology," Ajis. Australian Journal of Information Systems, Wollongong, Au. vol. 7, No. 1, Sep. 1999, pp. 41-59.

Mumick, I. S. et al. "Maintenance of Data Cubes and Summary Tables in a Warehouse," SIGMOD 1997. ACM SIGMOD International Conference on Management of Data, Tucson, AZ, USA, May 13-15, 1997, vol. 26, No. 2, pp. 100-111, XP002074807, Jun. 1997, ACM, USA.

Mumick, I.S., "Magic is Relevant," Sigmod Record, Sigmod, New York, NY, US, vol. 19, No. 2, Jun. 1, 1990, pp. 247-258.

Rodriguez, J. et al., "IBM WebSphere Transcoding Publisher V1:1: Extending Web Applications to the Pervasive World," <http://ibm.com/redbooks>, Jul. 2000, pp. 1039.

Rousskov, A. et al., "Cache Digests," Computer Networks and ISDN Systems, 30 (1998) 2144-2168.

Roy, P. et al., "Don't Trash Your Intermediate Results, Cach'em," Technical Report, Online, Mar. 2, 2000, pp. 1-22.

Shneiderman, B. et al., "An Architecture for Automatic Relational Database System Conversion," ACM Transactions on Database Systems, vol. 7, No. 2, 1982.

Schneier, B., "Applied Cryptography, Second Edition," 1996, pp. 189-196, 226-227.

Shanmugasundaram, J. et al., "Relational Databases for Querying SML Documents Limitations and Opportunities," Proc. Of VLBD, pp. 302-314, 1999.

Seshadri, P. et al., "SQLServer for Windows CE-A Database Engine For Mobile And Embedded Platforms," Data Engineering 2000. Proceedings $16^{th}$ International Conference in San Diego, CA, US, Feb. 29, 2000, IEE Computer Soc., US, Feb. 29, 2000, pp. 642-644.

Shimura, T. et al., "Storage and Retrieval of XML Documents Using Object-Relational Databases," Proc. Of DEXA, pp. 206-217, 1999.

Shu, N. et al., "Convert: A High Level Translation Definition Language for Data Conversion," Communications of the ACM, vol. 18, No. 10, Oct. 1975, pp. 557-567.

Shu N. et al., "Convert: A High Level Translation Definition Language for Data Conversion," Proceedings of the 1975 ACM SIGMOD International Conference on Management of Data, May 1975, p. 111.

Shu, N. et al., "Express: A Data EXtraction, Processing, and REStructuring System," ACM Transactions on Database Systems, vol. 2, No. 2, Jun. 1977, pp. 134-174.

Shu, N., "Automatic Data Transformation and Restructuring," IEEE, 1987, pp. 173-180.

Squire, C., "Data Extraction and Transformation for the Data Warehouse," ACM Proceedigns of SIGMOD. International Conf. On Management of Data, vol. 24, No. 1, Mar. 1, 1995, p. 446.

Weyman, P.J., "The Case for a Process-Driven Approach to Data Warehousing," Database and Network Journal, A.P. Publications, London, FB, vol. 27, No. 1, Feb. 1, 1997, pp. 3-6.

White, C., "Data Warehousing: Cleaning and Transforming Data," INFO DB, vol. 10, No. 6, Apr. 1997, pp. 11-12.

White, C., "Managing Data Transformations," byte, McGraw-Hill Inc., St. Peterborough US, vol. 22, No. 12, Dec. 1, 1997, pp. 53-54.

Informatica Corporation, Release Notes, PowerCenter 1.6, PowerMart 4.6, Aug. 1999, pp. 1-30.

Informatica Corporation, User Guide, PowerCenter 1.6, PowerMart 4.6, Jul. 1999, pp. i-xxvii and 144-186 (Table of Contents, Preface, Chapters 6 & 7).

International Search Report and Written Opinion, PCT/US04/37698, Dec. 4, 2006, 12 pages.

* cited by examiner

SET-ORIENTED REAL-TIME DATA PROCESSING BASED ON TRANSACTION BOUNDARIES

BACKGROUND OF THE INVENTION

1. Field of the Invention

The present invention relates in general to data processing and database management. Specifically, the present disclosure relates to real time data processing in a database management system (DBMS) and particularly in Extract, Transformation, and Load (ETL), enterprise application integration (EAI), and enterprise information integration (EII). More specifically, the present disclosure provides set-oriented data transformation based on transaction boundaries.

2. Description of the Related Art

Many types of data processing operations associated with a DBMS or through ETL are batch-oriented. The batch-mode processing is performed after all data records in a data source are read and the output is produced only after the entire batch of data records is processed. The batch-mode transformation introduces intrinsic delays in data processing. Such delays become more problematic in cascades of multiple transformations that involve multitudes of data records or rows, as the delay at one step would undermine the timeliness or responsiveness of the overall processing.

One example of batch-mode transformation can be found with aggregation, which is typically performed across all input data in a batch. In a wholesale setting, for instance, a number of ORDERS arrive in a message queue. Each ORDER is included in one message and the ORDER contains multiple LINEITEMs. To compute the sum of the dollar amount of all LINEITEMs in each ORDER, a batch-oriented system would calculate the sum across all ORDERS in the system. If an ORDER_ID uniquely identifying each ORDER is available, the sum within each ORDER could be computed by using the ORDER_ID as the group by key for the aggregation. Even if this were the case, the aggregation results may not be available until all the input data has been read. This is because batch-oriented systems typically presume that aggregation is to be performed across all input data. Similar situations will result in other multi-row transformations such as sorter, joiner, ranking, etc. The batch mode processing thus makes it nearly impossible to achieve the real-time responsiveness.

A need for data processing on a real-time basis is nonetheless conspicuous. For example, a retail store needs to know the up-to-minute summary of inventories; a postal mail service needs to provide customers with up-to-minute reports on their shipments; a financial service institution needs to continuously update its investors on the changes to their portfolios; and, a healthcare institution needs to provide access to physicians and insurance administrators the updated patient information and most current prognosis reports.

There is a further need to break the batch-mode processing and substitute therefore, the data processing based on smaller data sets. The set-oriented processing would eliminate the delay of waiting on the entire batch to be read and processed. In the above example, the aggregation results for each data set—each ORDER—may be made available immediately in a set oriented real-time data processing system.

There is a still further need for a methodology to define transaction boundaries among the input data and thereby deriving data sets based on the applicable rules or business logic for data transformation on a real-time basis.

SUMMARY OF THE VARIOUS EMBODIMENTS

The present invention overcomes the limitations of batch-mode data processing by setting and propagating transaction boundaries for data transformation and thereby enables set-oriented data processing in real time. The invention supports cascades of data transformations on multitudes of data records and rows based on synchronized transaction boundaries. The invention may be implemented in conjunction with a relational DBMS, object DBMS, or any other DBMS. It may be advantageously applied in ETL, EAL, and EII.

In one embodiment, a method for processing a plurality of data records is provided. The method comprises: setting transaction boundaries among the plurality of data records thereby dividing the plurality of data records into one or more data sets; processing each of the data set thereby producing a multiplicity of results from the one or more data sets; and completing the processing of the plurality by synchronizing the transaction boundaries and combining the multiplicity of results.

In another embodiment, a method for performing a series of transformations on a plurality of data records is provided. The series of transformations initiate at a source and conclude at a target. The method includes the steps of: setting transaction boundaries among the plurality of data records at the source thereby dividing the plurality of data records into one or more data sets; propagating the transaction boundaries through the series of transformations from the source to the target; performing the series of transformations based on the one or more data sets thereby producing a multiplicity of results from the series of set-based transformations; and completing the series of transformations by synchronizing the transaction boundaries and combining the multiplicity of results.

In accordance with this disclosure, there is provided, in yet another embodiment, a system for processing a plurality of data records. The system has: means for setting transaction boundaries among the plurality thereby dividing the plurality into one or more data sets; means for processing each of the data set thereby producing a multiplicity of results from the one or more data sets; and means for synchronizing the transaction boundaries and combining the multiplicity of results thereby completing the processing.

In accordance with this disclosure, there is provided, in still another embodiment, a system for performing a series of transformations on a plurality of data records. The series of transformations initiate at a source and conclude at a target. The system has: means for setting transaction boundaries among the plurality at the source thereby dividing the plurality into one or more data sets; means for propagating the transaction boundaries through the series of transformations from the source to the target; means for performing the series of transformations based on the one or more data sets thereby producing a multiplicity of results from the series of set-based transformations; and means for synchronizing the transaction boundaries and combining the multiplicity of results thereby completing the series of transformations.

In one embodiment, the transaction boundaries are defined based on the row count of the data records. In another embodiment, the transaction boundaries are defined based on the time stamp of the data records. In yet another embodiment, the transaction boundaries are defined based on the result of a previous data transformation.

In still another embodiment, the transaction boundaries are defined based on a user-defined logic. The user-defined logic is one or more rules defined by a user. In a further embodiment, the user-defined logic is on a real-time basis. In a still further embodiment, the rules comprise one or more tables in a database. In another embodiment, the rules comprise one or more statements defining relationships and actions in a suitable programming language. In yet another embodiment, the suitable programming language is one of Generation III Languages (3GL), Generation IV Languages (4GL), and Generation V Languages (5GL). In still another embodiment, the suitable programming language is an expert system tool.

In a further embodiment, the means for propagating the transaction boundaries maintains one or more transaction queues capable of defining the boundaries of the data sets. In a still further embodiment, the transaction queues comprise one or more tables in a database. In another embodiment, the transaction queues are maintained in a computer memory.

In still another embodiment, the series of transformations comprise at least one of insert, update, delete, aggregation, rank, sort, sequence, and join.

DETAILED DESCRIPTION OF THE VARIOUS EMBODIMENTS

Discussion of the Relevant Terms

Figure 1:
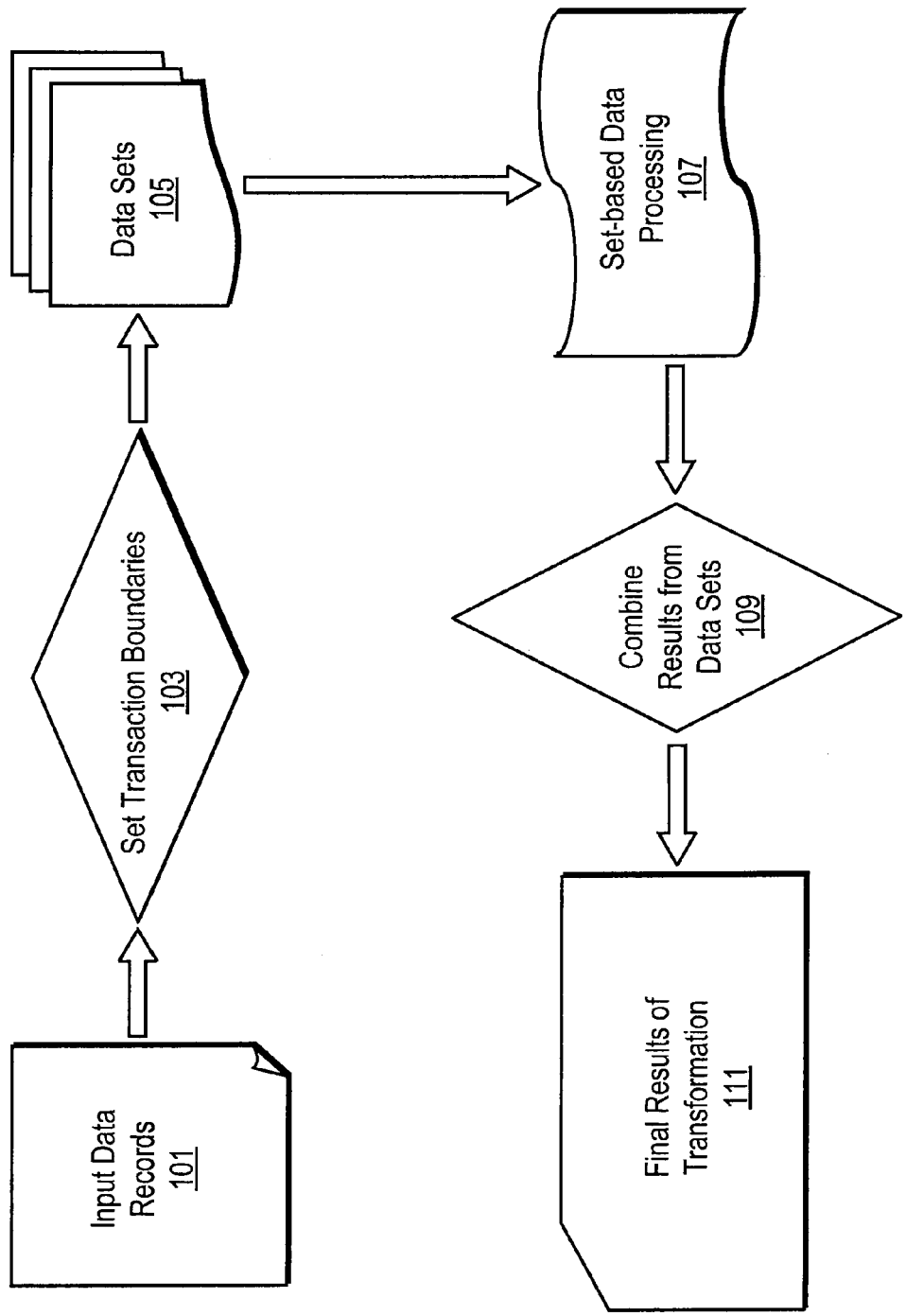
FIG. 1 is a flow chart showing the steps of set-based data transformations according to one embodiment.

The following terms, data, data stream, relational database, database management, programming languages, table, record, row, column, join, sort, rank, aggregation, commit, roll back, as well as other relevant terms throughout the present disclosure, are to be understood consistently with their typical meanings established in the relevant art, i.e. the art of information technology, computer sciences, mathematics, statistics, data processing, and knowledge management.

Transformation, as used herein, refers to a form of data processing that derives one or more sets of output rows or records from one or more sets of input rows or records. In certain embodiments, "transformation" is used interchangeably with "data processing." For example, in the context of a DBMS, whether a relational DBMS or an object DBMS, "transformation," "data transformation," and "data processing" are used synonymously.

Source or data source, as used in this disclosure, refers to the data input as well as the system where the input data is stored. A source may include one or more input table or one or more rows and records from the input table. A source may be a relational database, an object database, a data warehouse, a file, a message queue, or other data sources. In certain embodiments, "source" and "source system" are used interchangeably.

Target or data target, as used in this disclosure, refers to the data output as well as the system where output data is loaded. A target may include one or more output table or one or more rows and records from the output table. A target may be a relational database, an object database, a data warehouse, a file, a message queue, or other target data depositaries. In certain embodiments, "target" and "target system" are used interchangeably.

Mapping, as used herein, refers to the correspondence between the input data or the source and output data or the target, as well as the transformation from the source to the target. A mapping may include multiple sources and targets.

Generation III Languages (3GL), as used herein, refer to high-level programming languages, such as PL/I, C, C++, or Java. Typically, a compiler converts the statements of a specific high-level programming language into machine language. According to certain embodiment, 3GLs encompass script languages such as Perl, JavaScript, Visual Basic, and Tcl/Tk.

Generation IV Languages (4GL), as used herein, refer to the programming languages that are designed to be closer to natural language than a 3GL language. Languages for accessing databases, such as SQL statements, belong to the 4GLs.

Generation V Languages (5GL), as used herein, refer to programming languages that use a visual or graphical development interface to create source language that is usually compiled with a 3GL or 4GL language compiler. For example, companies like Microsoft, Borland, IBM, and others make 5GL visual programming products for developing applications in Java, and C. With 5GLs, a developer may visualize class hierarchies and drag icons to assemble program components.

Data set, as used in this disclosure, refers to one or more contiguous records or rows grouped together for processing. Data sets define logical transformation boundaries in a data stream. Data sets may be set according to row counts (e.g., a set may be defined as n rows or records in a source table), time (e.g., a set may be defined as all the rows or records within a given period of time), or other rules including user-defined logic. According to one embodiment, data sets do not overlap with each other. A data set may contain multiple nested datasets, which are non-overlapping at each level.

Transaction set, as used in this disclosure, refers to one or more data records grouped together for processing. A transaction set may be used interchangeably with a data set in certain embodiments. A transaction set may contain one or more data sets in alternative embodiments. When data transactions are performed based on a data set, the data set becomes a transaction set. A transaction set boundary must coincide with a data set boundary.

A transaction occurs when the changes to the data records are committed or rolled back. In certain embodiments, the data processing operates on a set without an explicit commit or rollback after the end of the data stream. This is still considered as a complete transformation or transaction of the data set. A transaction set is transactionally applied to a target system. That is, the changes are considered to be simultaneous among the records or rows in the transaction. Transaction sets define logical transaction boundaries in a data stream. Transaction sets may be set according to row counts, time, or other rules including user-defined logic. Transaction sets are non-overlapping in one embodiment. Detailed discussions of data sets and transaction sets are set forth below.

Transaction Boundaries Defined to Support Real Time Data Processing

The present disclosure provides a mechanism for defining transaction boundaries and thereby grouping multiple rows of data records into data sets or transaction sets. Transformations based on smaller data sets—as opposed to the entire batch of data—afford improved flexibility and timeliness in the overall data processing. The output of results on the smaller data sets is made immediately available upon completion of each transaction defined by the transaction boundaries. Such immediacy substantiates the real-time responsiveness to data queries. The delay in batch-oriented transformation caused by reading and processing all the rows in the entire batch of data source is eliminated or substantially reduced.

In one embodiment, a real-time or near real-time multi-row data transformation is performed by setting transaction boundaries among a plurality of data records, processing the data sets defined by the transaction boundaries, and combining the results from the set-based processing. The plurality of records may encompass multiple rows of data, including rows of interrelated data records. For example, a plurality of records can encompass one ORDER record and multiple LINEITEM records that belong to the ORDER. In other words, the plurality of records includes multiple records of one or more record types.

Referring to FIG. 1, the input data 101 contains multiple rows of data records. Transaction boundaries are defined and set (103) within the data records (101) to produce a collection of data sets or transaction sets (105). Data processing or transformation (107) is then performed based on the data sets (105). The results from set-based transformation are then combined (109) to produce the final results (111).

In another embodiment, a series of transformations is performed on multi-row data records by setting transaction boundaries among multi-row data records, propagating the transaction boundaries through the series of transformations, processing the data sets defined by the transaction boundaries, and combining the results from the set-based processing. The series of transformations may be performed on real time basis based on certain rules or user-defined logic.

In yet another embodiment, a system is provided for real-time or near real-time data processing of multi-rows of data records. The system includes means for setting transaction boundaries in multi-row data records, means for processing data sets based on transaction boundaries; and means for synchronizing the transaction boundaries and combining the results of set-based transformations.

Figure 2:
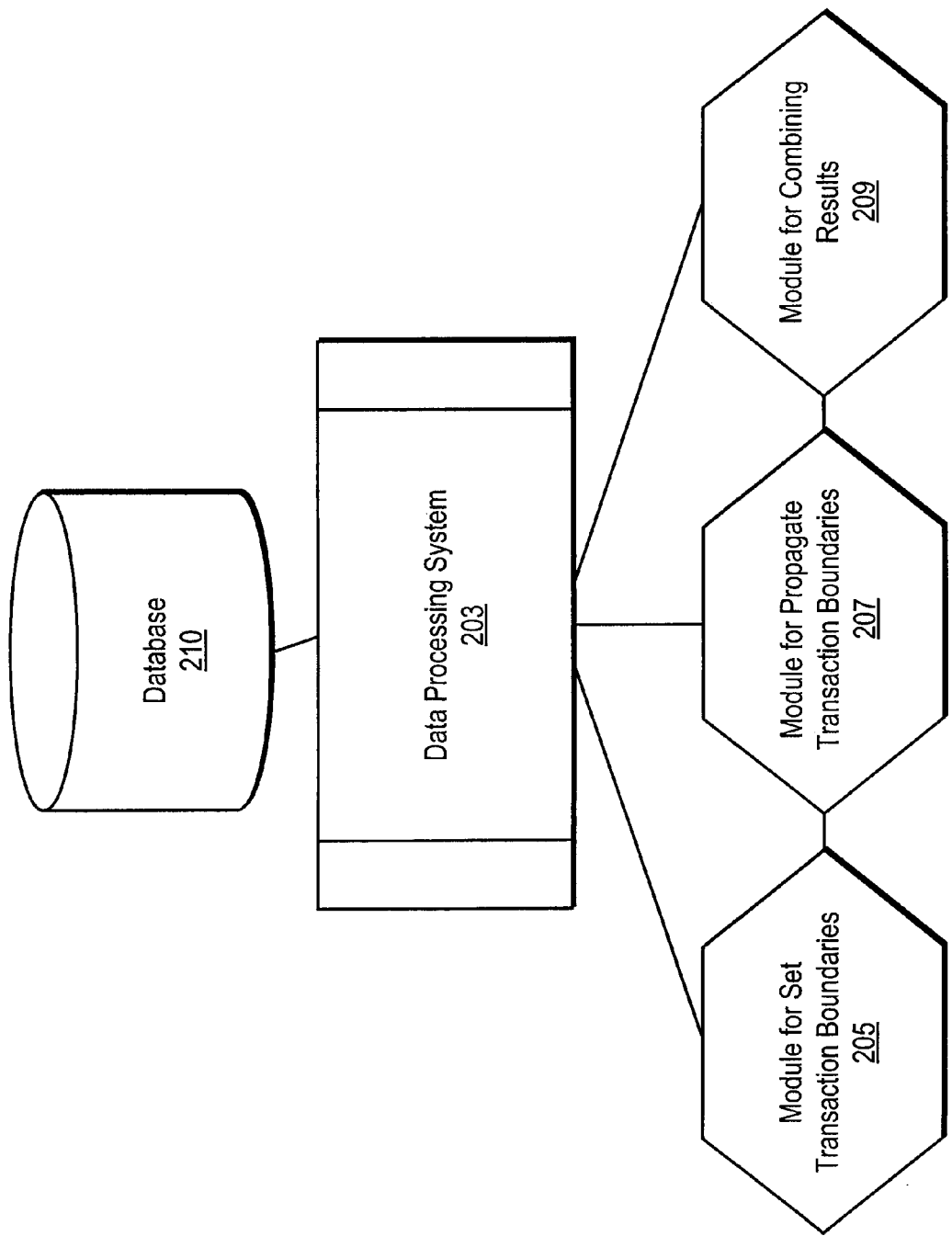
FIG. 2 is a block diagram of a system for set-based data transformation in one embodiment.

For example, referring to FIG. 2, a database 201 is connected to a data processing system or unit 203. Also linked to the data processing system (203) is a module (205) that is adapted to setting transaction boundaries, a module (207) that is adapted to propagating transaction boundaries, and another module (209) that is adapted to synchronizing the transaction boundaries and combining the results from set-based transformations. The modules 203, 205, and 207 thus provide an extension of the data processing system (203) and enable the set-based data transformation on the data records stored in database (201).

A system is provided for performing a series of transformations on a plurality of data records. The system includes means for setting transaction boundaries among multi-row data records, means for propagating the transaction boundaries through the series of transformations, means for performing the series of transformations based on data sets, and means for synchronizing the transaction boundaries and combining the results of set-based transformations.

The data processing systems may be implemented as software or hardware solutions in various embodiments. The enumerated means constituting the data processing systems in the various embodiments may be a software module, a firmware element, or a hardware component. Computer program products that implement the set-oriented real-time data transformation systems are provided in one embodiment. Also provided are computer readable media having recorded thereon program instructions which when processed by a computer are capable of executing the method of set-oriented real-time data transformation according to this disclosure.

Transaction boundaries are set to break the input data stream into data sets for transformation. Such transaction data sets are defined based on applicable rules or logic in a given situation. Simply applying real-time flushes cannot be used to set logical transaction boundaries, as they merely impose a latency control and guarantees no consistency.

According to the present disclosure, the means for setting transaction boundaries defines the transaction boundaries based on (i) the row count of the data records in one embodiment; (ii) the time stamp of the data records in another embodiment (e.g., the time when the data records become available); and, (iii) the result of a previous data transformation in yet another embodiment. The multiple and series of transformations may thereby synchronize and coordinate the transaction boundaries through the set-based transformations and combine the results thereof to complete the entire data processing (see below, example 2).

In a further embodiment, the means for setting transaction boundaries comprises defining the transaction boundaries based on a user-defined logic. The user-defined logic is one or more rules defined by a user. The rules may be implemented in one or more tables in a database or one or more statements defining relationships and actions in a suitable programming language. The suitable programming language includes a 3GL, 4GL, and 5GL. The suitable programming language may be an artificial intelligent programming language such as an expert system tool. The examples include Common LISP and CLIPS (C Language Integrated Production System).

In a further embodiment, the user-defined logic defines rules for real-time processing. For example, the user-defined rules may specify a short time interval for processing data sets that arrive at a source of message queue thereby achieving the real-time responsiveness. See below, example 2. The user-defined rules may specify the transaction boundaries wherever a user report is scheduled thereby masking the latency of processing time and producing a real-time effect.

Multi-Row Transformations Based on Data Sets

Data transformations are performed based on data sets or transaction sets according to the methods and systems of this disclosure. Data is processed within transaction boundaries. Where the real-time responsiveness is desired and supported, the transactions in one embodiment flush the data through the mappings or series of transformations to the target, rather than buffering it up for performance reasons. This assures that the data is transformed and loaded in real-time.

Methods or system means for general data processing and transformation in a database, whether a relational, object, or another DBMS, are known to an ordinarily skilled database engineer, application developer, or a database administrator. Examples of data transformations include insert, update, delete, aggregation, rank, sort, join, XML parser, and XML generator. The set-oriented data processing according to this disclosure adopts the data processing means for insert, update, delete, aggregation, rank, sort, join, XML parser, XML generator, among others, and applies the same to data set-based transformation.

For example, aggregation typically operates on the entire input data sets. An unsorted aggregator computes and outputs aggregates for the current transformation dataset, i.e., the entire outstanding input set. An unsorted aggregator resets its aggregation cache so that data from the current transformation dataset does not affect the aggregation results for any subsequent transformation dataset. The variable ports are also reset to their initial values. A sorted aggregator computes and outputs aggregates for the current transformation input data by key. It resets its state for a new input set by key for the first group in the next transformation dataset. The variable ports are also reset to their initial values.

In one embodiment, set-based aggregation or incremental aggregation is provided. It applies to unsorted aggregation, for example. The aggregation may be incremental across session runs or transactions. Each set transformation may in effect constitute a separate session run or transaction. The aggregates are output at the end of a transaction boundary. The variable ports are reset to their initial values based on the transaction boundaries.

Rank may be performed in a set-oriented mode according to one embodiment. It outputs the rank results for each transaction dataset. It re-initializes its cache in preparation for ranking the next dataset. The variable ports are also reset to their initial values. In other embodiments, rank operates in one mode to process the current input transformation set.

Set-oriented sorter may also be supported according to another embodiment. When the sorter receives transaction boundaries, it sorts and outputs rows for each of the data sets or transaction sets. It clears out its buffers (in memory or on disk) in preparation for sorting the next dataset. In alternative embodiments, the sorter does not implement the "incremental sort" functionality. The sorted output for each transformation input set includes data from all previous transformation input sets, and thus no need for sorting smaller transaction sets separately.

According to a further embodiment, joiner is performed based on data sets or transaction sets. Various types of joins are supported, including sequential join, concurrent join, nested-loop join, and sorted-merge join, among others.

Self join, or same-virtual source join, is a join where the master and detail inputs of the joiner come from a single source or a single virtual source. For example, a multi-group data source or a transformation with multiple output groups may be self-joined based on the data sets or groups. See below, example 2. Such data sets or groups may be treated as transaction sets. They may result from a previous transformation that is based on transaction sets. In one embodiment, the same virtual source join is defined for the concurrent sort-merge joiner. Since both the inputs come from the single source of transformation datasets, the resulting datasets of the join correspond directly to the datasets of the virtual source. The outer-joins are done within each input dataset.

Whether the join is from the same group of a source, or from multiple groups of the same source, transaction boundaries are set at the source. These boundaries propagate in the data stream on both inputs to the concurrent sort-merge joiner, for example. When the concurrent sort-merge joiner receives the corresponding set boundaries on both inputs, it first performs outer join (if specified) as if an End-of-File (EOF) was received on both inputs (thus processing the set as a typical data batch), and next resets its state for outer joins in preparation for the next data set.

A different-source join receives data inputs from different sources. It enables set-oriented processing in certain embodiments and in other embodiments only supports batch-mode transformation. For the sequential sorted-merge join, sequential nested-loop join, and concurrent nested-loop join, two source inputs are typically provided: a master and a detail. The master cache needs to be populated fully before the detail can be processed. The detail input may support real-time transformation based on transaction sets. The only state for the detail input is the outer join (if specified) results. The outer join rows can be output at the end of each of the detail datasets.

In a still further embodiment, the sequence transformation may be performed based on transaction sets. It has a "reset" flag. When the flag is turned on, the counter value for the sequence is reset to its initial value at each of the transaction boundaries in the input data. Because the same sequence may be connected to multiple transformations, if these transformations are running concurrently, the sequence numbers they receive will be from one shared counter. Resetting the sequence by the consumer may interfere with the sequence values delivered to other transformations.

Thus, in another embodiment, the sequence only resets at the transaction boundaries when it is not feeding concurrent transformations. In alternative embodiments, the sequence transformation does not respond to transaction sets; it operates based on the entire input data set.

An expression transformation supports set-oriented processing in certain embodiments. It resets all the variable ports to their initial values when receiving a transaction boundary.

In still another embodiment, transformations in a "pull pipeline" may be performed based on transaction sets. A "pull pipeline" originates from a sequence transformation and concatenates into a transformation along with a pipeline that originates from a source transformation. The pull pipeline transformation responds to transaction data set boundaries arriving at the point of the concatenation of the pipeline. For example, if the pull pipeline has an expression transformation, its variable ports may be reset.

Preservation of Transaction Semantics through Cascades of Transformations

The method and system of this disclosure enables real-time data transformation based on data sets or transaction sets. The set-oriented mode is supported in cascades of multiple transformations. Each transaction boundary in the input data stream is propagated through the cascades of transformations and thereby preserving the transaction semantics from the data source to the target.

The results from each transaction set are combined with the results from the other transaction sets, or fed into the input of a subsequent transformation to complete the series of transformations. Transaction sets are synchronized or coordinated when the results of multiple set-based transformations are combined.

In one embodiment, the propagation of the transaction boundaries is based on one or more transaction queues set and maintained in a computer memory or a database. A transaction queue is capable of defining the boundaries of the data sets or transaction sets in the input data stream. Each transaction for the series set-based transformations may be associated with and informed by a specific transaction queue. The transaction queue in one embodiment is maintained in a computer memory of a data processing system. In another embodiment, the transaction queue includes one or more tables in a database. The transaction queues set forth the start and end rows of each data set or transaction set. See, e.g., example 2 below.

The multi-row transformations based on preserved transaction boundaries according to certain embodiments may be implemented in conjunction with a database management system, such as a relational DBMS, object DBMS, or any other DBM, a text file, a XML document, a message queue, and an Enterprise Resource Planning (ERP) system. The method and system for such set-oriented transformations according to one embodiment may be applied in ETL, EAI, and EII to enhance the flexibility and real-time responsiveness of data processing and dissemination in an enterprise setting thereby facilitating effective information management.

The various embodiments are further described by the following examples, which are illustrative of the disclosed embodiments but do not limit the same in any manner.

EXAMPLE 1

Transaction Boundaries in Employee Records Data

This example describes the data processing steps for answering a query to a database of employee records. Transaction boundaries are defined according to one embodiment. Set-based transformations are performed to produce the final results.

Consider the query: given a list of employee records, find all employees that earn more than the average salary in their respective departments.

Figure 3:
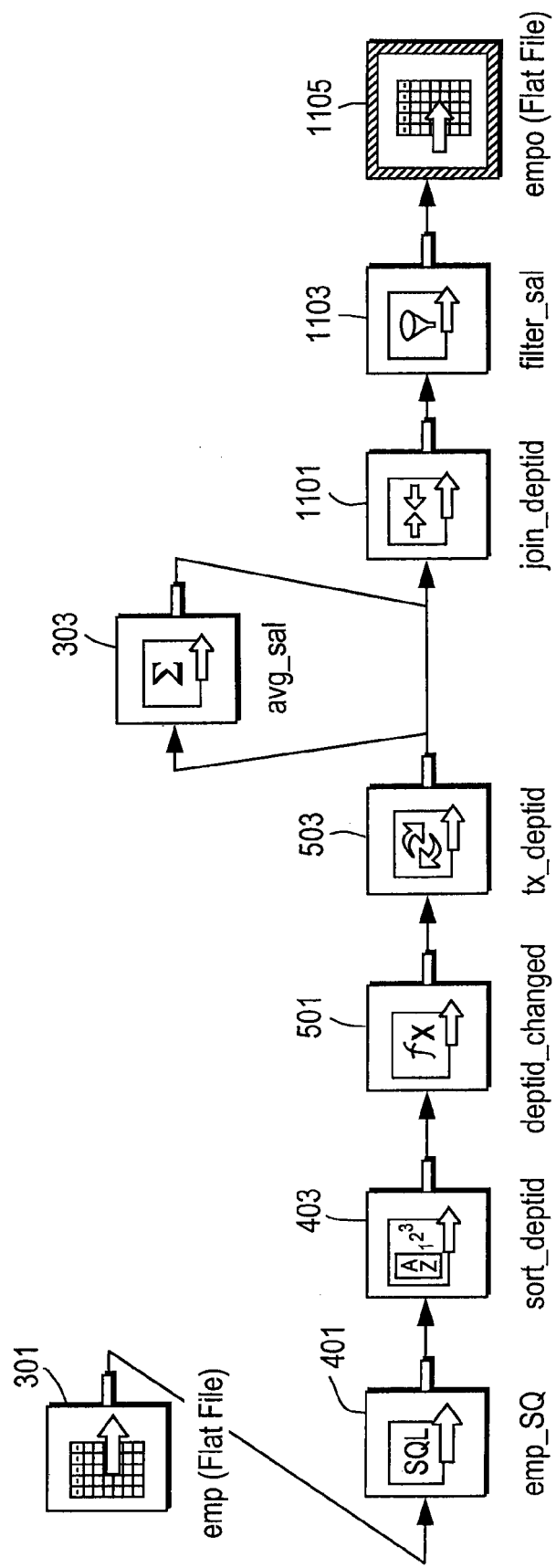
FIG. 3 shows an overview of the mappings of relevant tables and data transformations for answering a database query according to one embodiment.

An overview of the mappings of relevant tables in the database and a number of data transformations for this query is shown in FIG. 3. Certain reference numerals in FIG. 3 correspond to the graphical components or transformations in the subsequent FIGS. 4-10.

Referring to FIG. 3, the employee (emp) source file (101) contains the following fields:
Employee ID (empid).
Department ID (deptid).
Employee Name (ename).
Salary (sal).

Suppose the following are the input data from the emp source file (101):
empid, deptid, ename, sal
1,2,'John',80000
2,1,'Jack',75000
3,3,'Sally',85000
4,1,'William',65000
5,3,'Sue',45000
5,2,'Mark',82000
7,2,'Bart',74000
8,1,'Steven',96000
9,3,'George',56000
9,1,'Brenda',86000
10,3,'Sam',49000
11,2,'Anne',79000
11,1,'Jill',68000
12,3,'Patrick',77000

Figure 4:
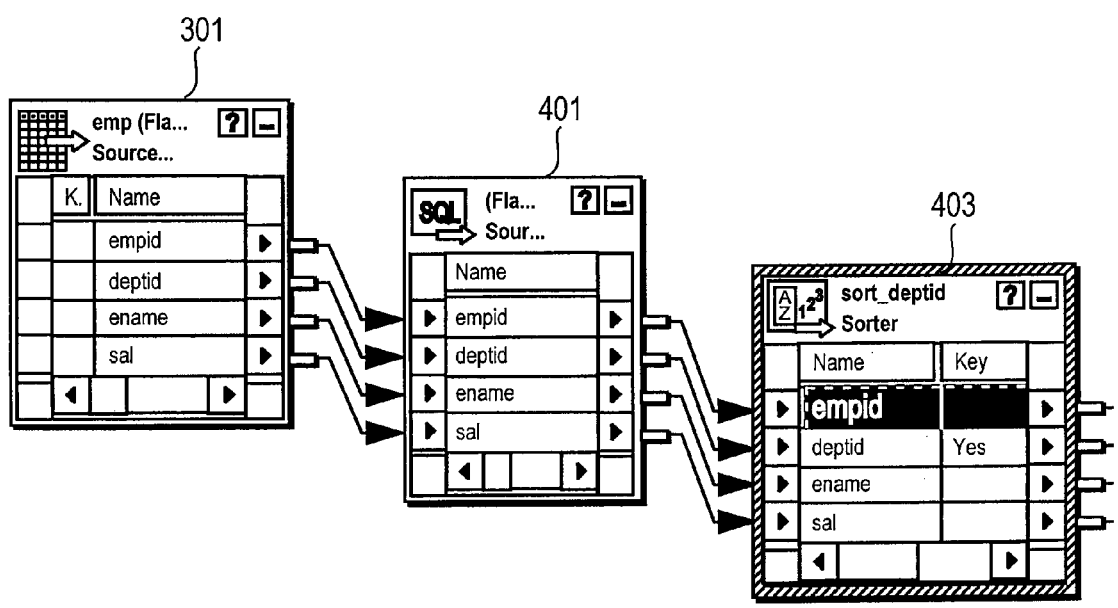
FIG. 4 shows the transformation of sorting the data records according to one embodiment.
Figure 5:
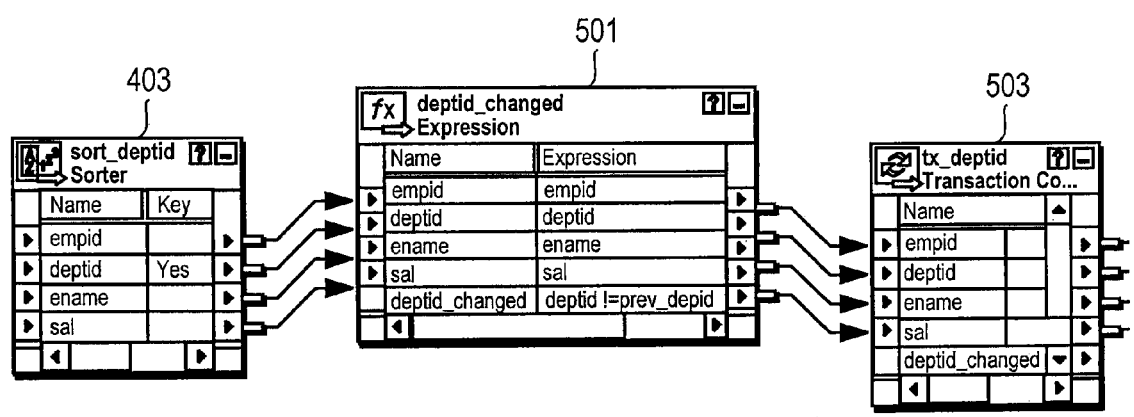
FIG. 5 shows how transaction boundaries are defined and set according to one embodiment.

The first step is to read (201) the source file (101) and sort it on depid as the sort key (203), as shown in FIG. 4. The result of the sorting is as follows:
empid, deptid, ename, sal
2,1,'Jack',75000
4,1,'William',65000
8,1,'Steven',96000
9,1,'Brenda',86000
11,1,'Jill',68000
1,2,'John',80000
5,2,'Mark',82000
7,2,'Bart',74000
11,2,'Anne',79000
3,3,'Sally',85000
5,3,'Sue',45000
9,3,'George',56000
10,3,'Sam',49000
12,3,'Patrick',77000

Figure 6:
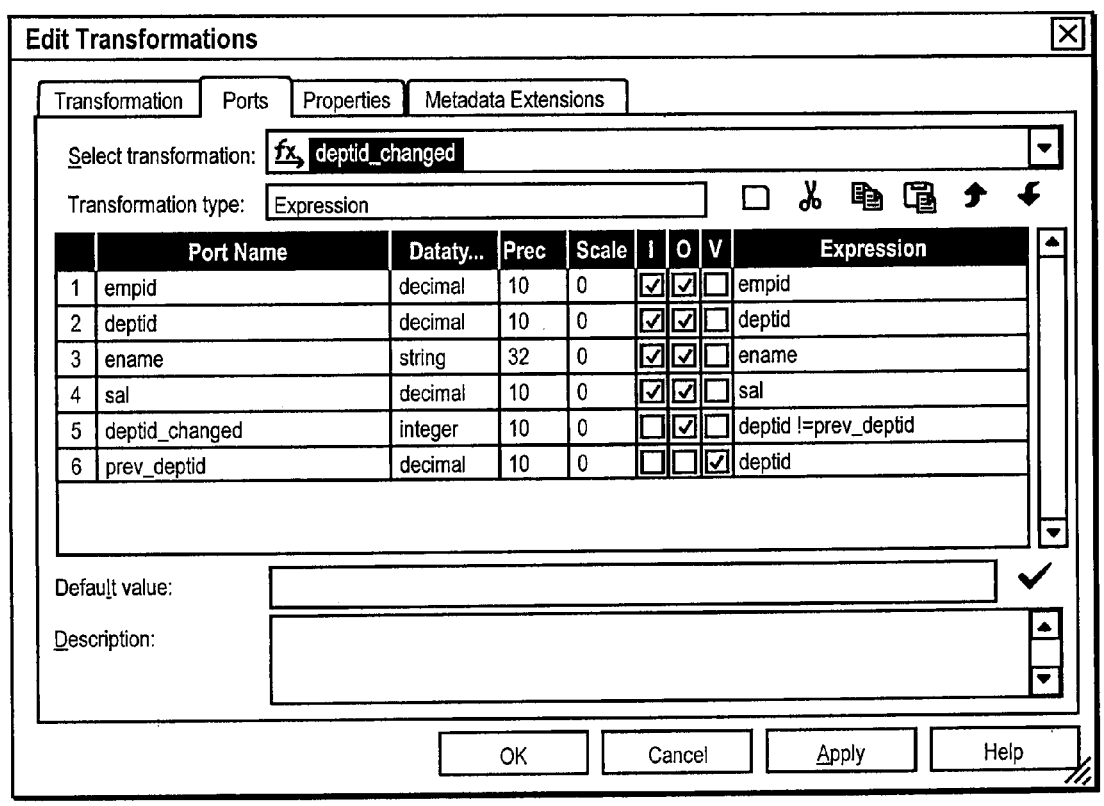
FIG. 6 shows various data ports or variables of a condition-checking transformation that defines transaction boundaries according to one embodiment.
Figure 7:
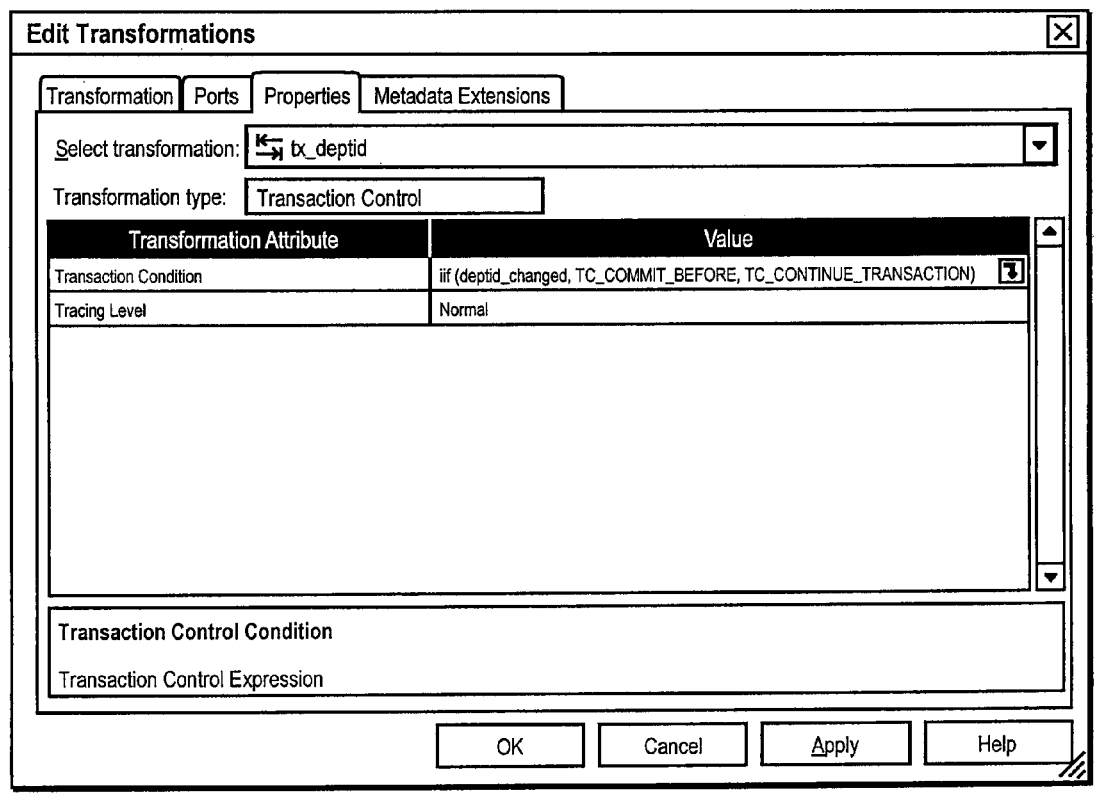
FIG. 7 shows the attributes of a transaction control transformation that sets transaction boundaries according to one embodiment.

Next, the employee records are divided into multiple transaction or data sets according to the different departments the employees belong to. That is, referring to FIG. 5, transaction boundaries are set (303) where the deptid changes (301). The deptid_changed expression transformation (301) determines if the deptid has changed by comparing the current value of deptid with the value from the previous row. The result of the change is output on a Boolean port deptid_changed. FIG. 6 shows the various data ports or variables of the deptid_changed expression transformation (301) according to one embodiment. The tx_deptid transaction control transformation (TCT) (303) uses the deptid_changed to insert a COMMIT before the row with a changed deptid. FIG. 7 shows the attributes of the tx_deptid transaction control transformation (303) according to one embodiment.

The employee data is thus divided into three transaction or data sets. The resulting data stream with the embedded commits is as follows:
empid, deptid, ename, sal
2,1,'Jack',75000
4,1,'William',65000
8,1,'Steven',96000
9,1,'Brenda',86000
11,1,'Jill',68000
<COMMIT>
1,2,'John',80000
5,2,'Mark',82000
7,2,'Bart',74000
11,2,'Anne',79000
<COMMIT>
3,3,'Sally',85000
5,3,'Sue',45000
9,3,'George',56000
10,3,'Sam',49000
12,3,'Patrick',77000

Figure 8:
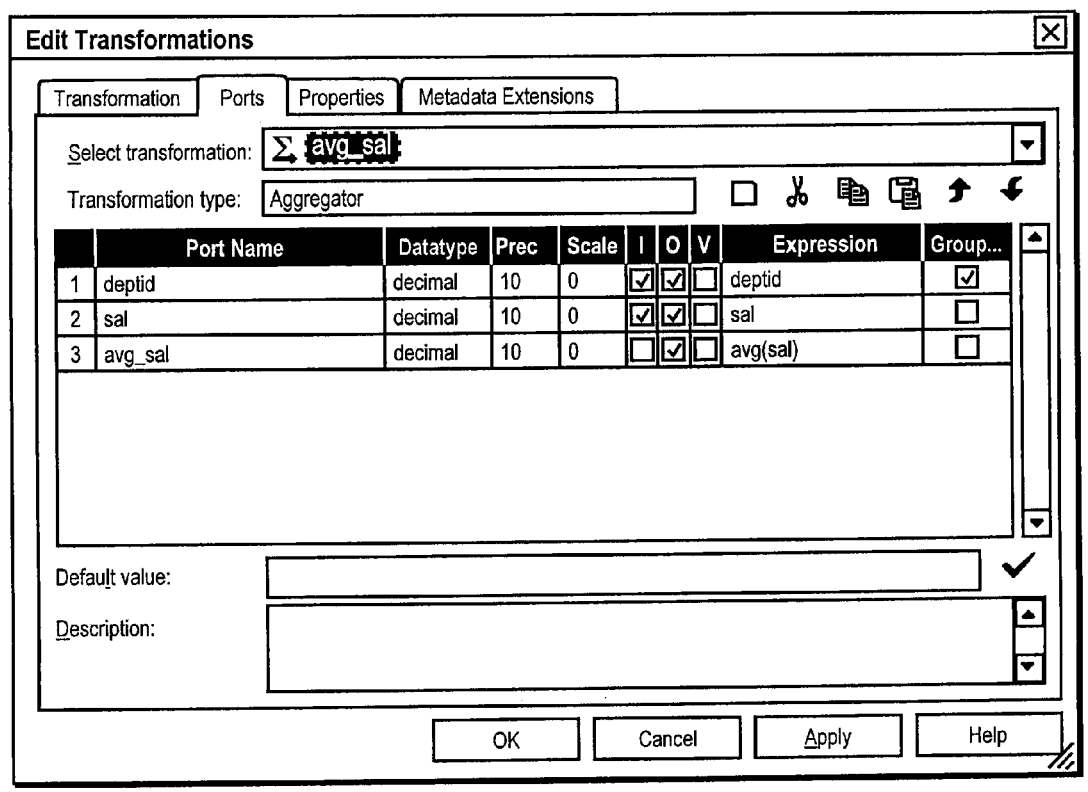
FIG. 8 shows various data ports of an aggregator transformation according to one embodiment.
Figure 9:
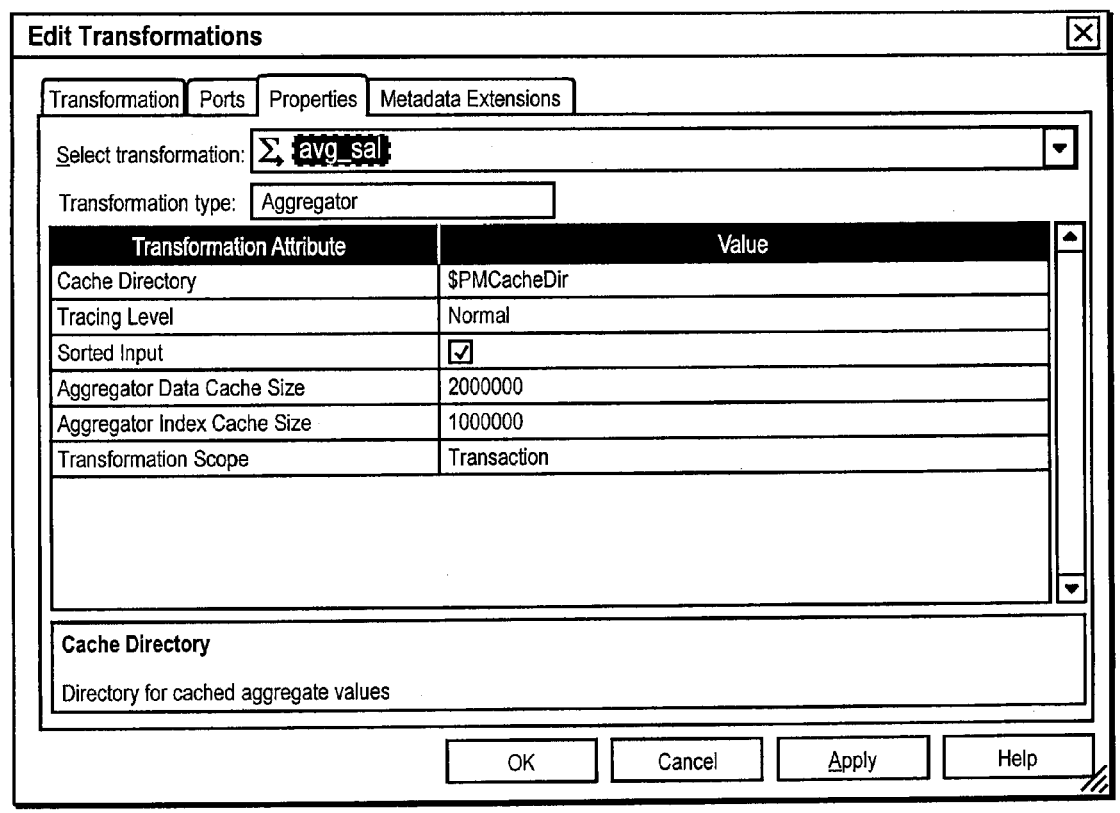
FIG. 9 is shows the attributes of the aggregator transformation of FIG. 8 according to one embodiment.

The next step is to compute the average of salary using the avg_sal aggregator transformation (103). The input to the aggregator is the deptid and sal columns only. FIG. 8 shows the various data ports or variables of the avg_sal aggregator transformation (103). FIG. 9 shows the attributes of the avg_sal aggregator transformation (103). The transaction boundaries are propagated into this transformation, shown as follows:
deptid, sal
1,75000
1,65000
1,96000
1,86000
1,68000
<COMMIT>
2,80000
2,82000
2,74000
2,79000
<COMMIT>
3,85000
3,45000
3,56000
3,49000
3,77000

According to one embodiment, the transformation scope of the aggregator is set to allow set-based transactions. The aggregator thus transforms within the input transaction boundaries. The results of aggregation are as follows, with the transaction boundaries preserved at the output. deptid, avg_sal
1,78000
<COMMIT>
2,78750
<COMMIT>
3,62400

Figure 10:
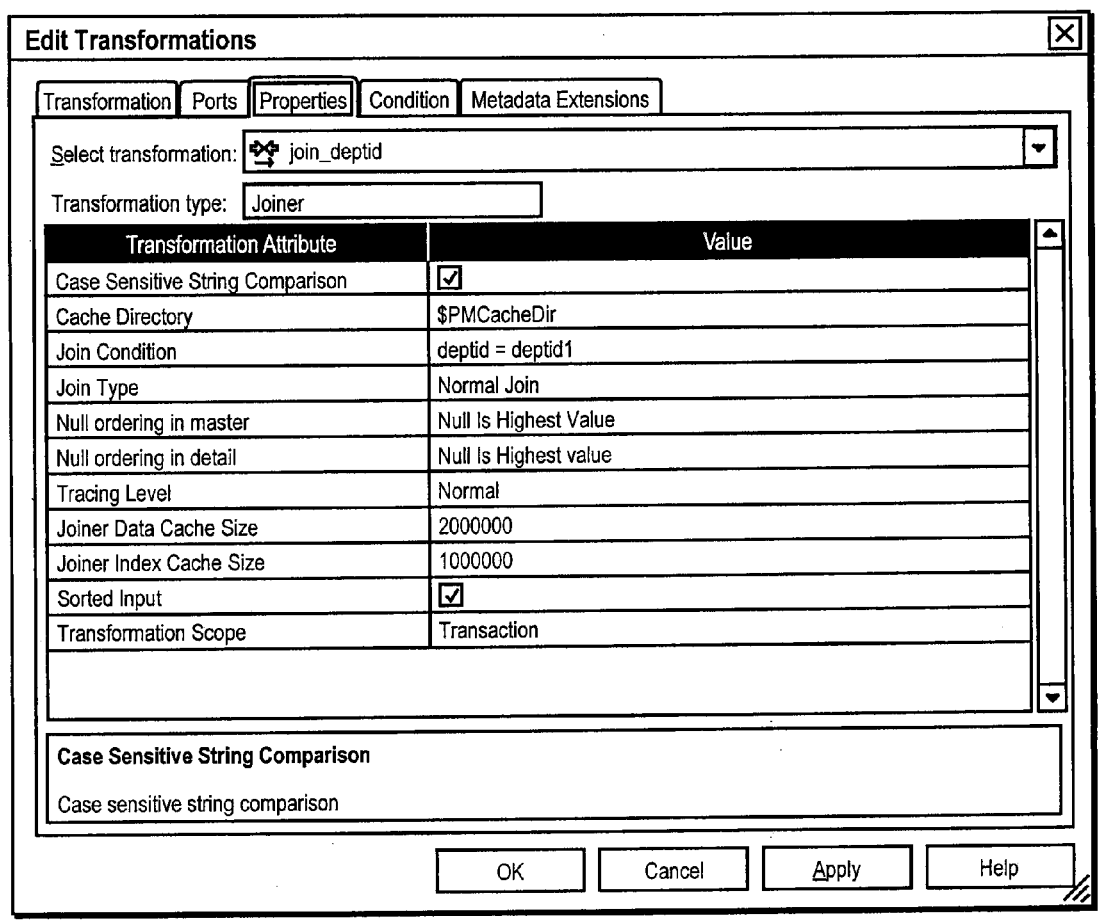
FIG. 10 shows the attributes of a joiner transformation that joins transactions based on preserved transaction boundaries according to one embodiment.
Figure 11:
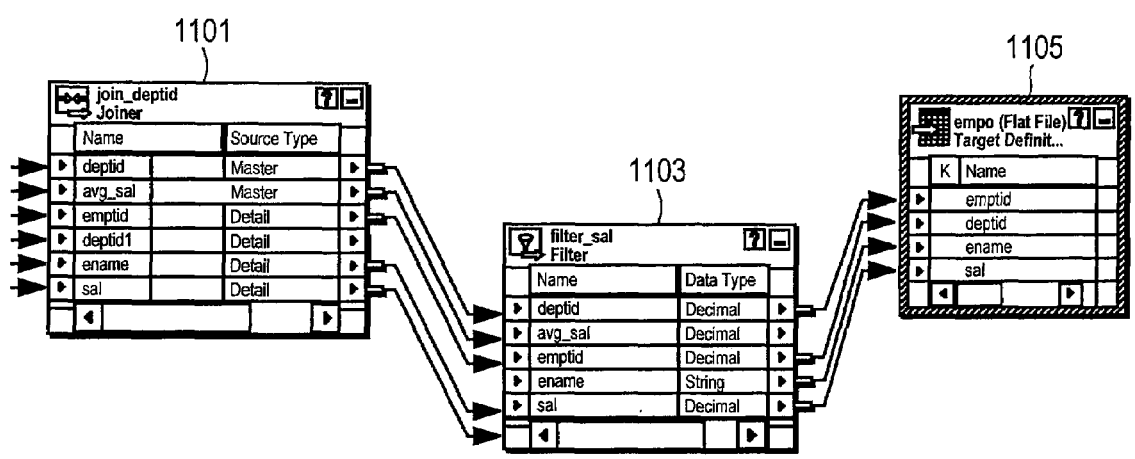
FIG. 11 shows a filter transformation, which allows the transaction boundaries in the data records to pass through and propagate onto the target according to one embodiment.

Further, the aggregator results are joined to the original data using the join_deptid joiner transformation (901), referring to FIG. 11. The join is performed on deptid. Transaction boundaries are further propagated to the joiner transformation. FIG. 10 shows the details of an editor (801) for defining and editing the join_deptid joiner transformation (901) according to one embodiment. The joiner synchronizes the transactions coming into its two input streams based on the transaction boundaries, joins within the transactions, and outputs the resulting data with transaction boundaries preserved.

The results of join are as follows:
empid, avg_sal, deptid, ename, sal
2,78000,1,'Jack',75000
4,78000,1,'William',65000
8,78000,1,'Steven',96000
9,78000,1,'Brenda',86000
11,78000,1,'Jill',68000
<COMMIT>
1,78750,2,'John',80000
5,78750,2,'Mark',82000
7,78750,2,'Bart',74000
11,78750,2,'Anne',79000
<COMMIT>
3,62400,3,'Sally',85000
5,62400,3,'Sue',45000
9,62400,3,'George',56000
10,62400,3,'Sam',49000
12,62400,3,'Patrick',77000

Figure 12:
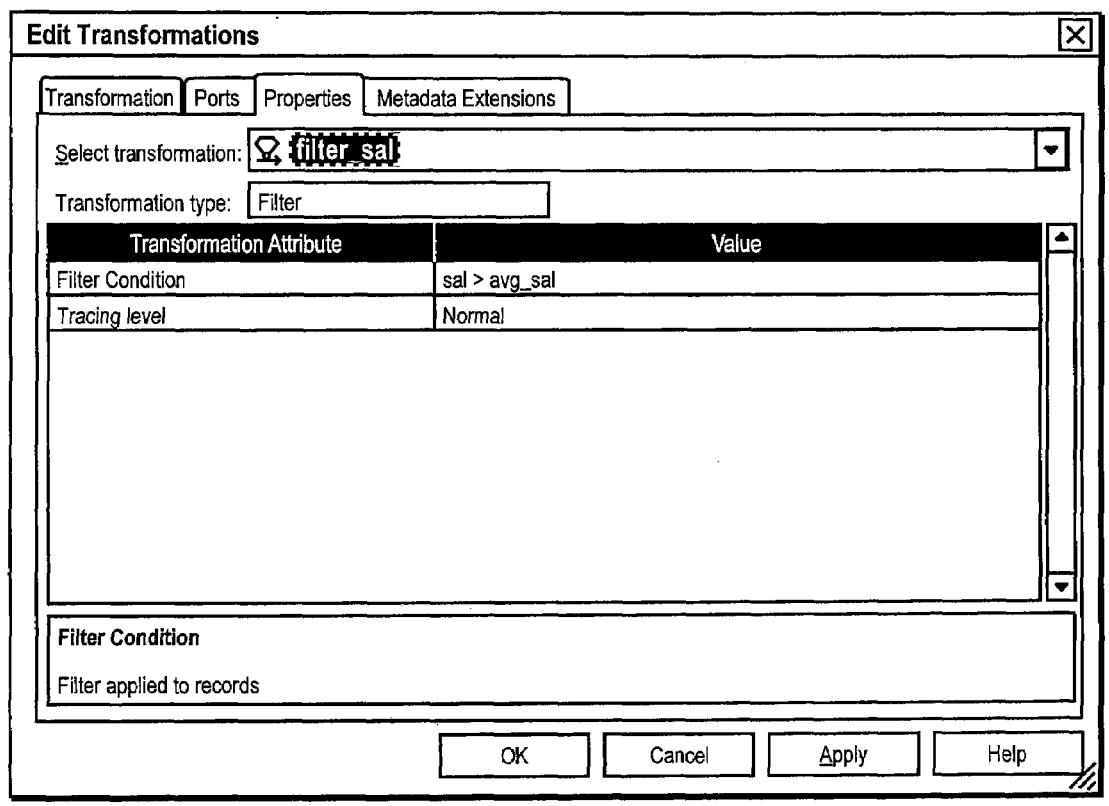
FIG. 12 shows the attributes of the filter transformation of FIG. 11 according to one embodiment.

Finally, the data records are processed to filter out (903) those with the sal value lower than avg_sal. FIG. 12 shows the details of an editor (1001) for defining and editing the filter transformation (903) according to one embodiment. The results from the filter transformation (903) are then loaded to the target (905). Because the filter (903) is a transformation with a row scope (i.e., it is not a set-oriented transformation), it simply allows the transaction boundaries in the data records to pass through and propagate onto the target.

The final results of this transformation are as follows:
empid, avg_sal, deptid, ename, sal
8,78000,1,'Steven',96000
9,78000,1,'Brenda',86000
<COMMIT>
1,78750,2,'John',80000
5,78750,2,'Mark',82000
11,78750,2,'Anne',79000
<COMMIT>
3,62400,3,'Sally',85000
12,62400,3,'Patrick',77000

The records are then loaded into the target:
empid, deptid, ename, sal
8,1,'Steven',96000
9,1,'Brenda',86000
<COMMIT>
1,2,'John',80000
5,2,'Mark',82000
11,2,'Anne',79000
<COMMIT>
3,3,'Sally',85000
12,3,'Patrick',77000

EXAMPLE 2

Set-Based Transformations from a Data Source of XML Document Records

This example describes a series of transformations from a data source of XML (Extensible Markup Language) document records. Transformations are performed within transaction boundaries, which are defined, propagated, and synchronized through cascades of transformations according to one embodiment.

Figure 13:
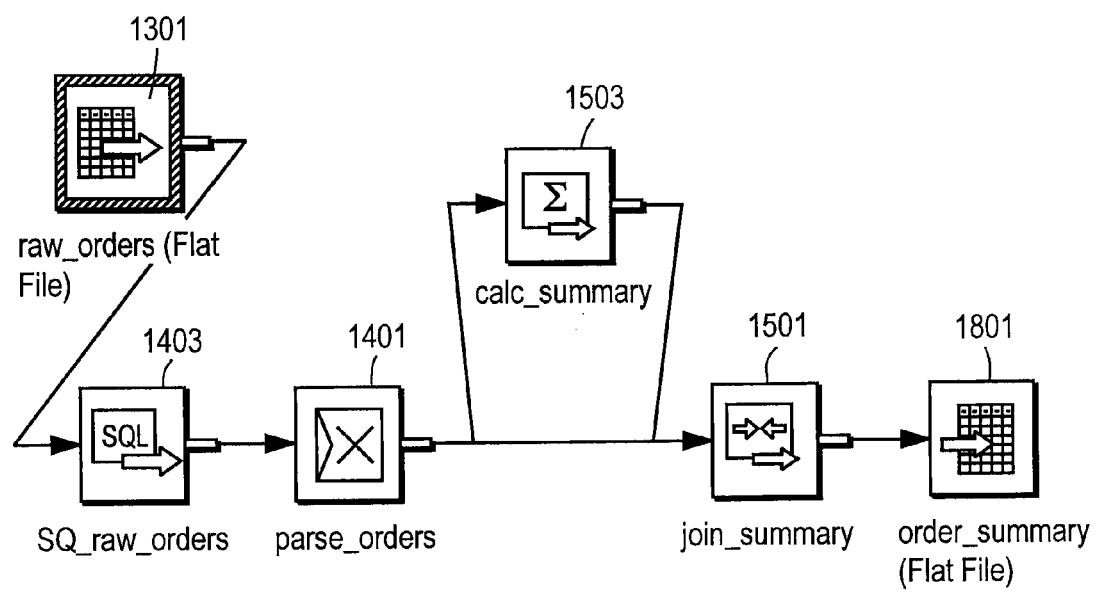
FIG. 13 shows an overview of the mappings of relevant tables and the series of transformations from a XML document source according to one embodiment.

FIG. 13 provides an overview of the mappings of the relevant tables and the series of transformations involved. Certain reference numerals in FIG. 13 correspond to the graphical components or transformations in the subsequent FIGS. 12-17.

Each source record consists of a single field representing an XML document, one document per row. Specifically, the source is a file (1101) with one XML document per line. Each XML document contains multiple ORDERS, where each ORDER contains multiple LINEITEMS. The object is to compute summary information, e.g., number of items and total amount, for each order and output the result to the target, the ORDER_SUMMARY table.

Suppose the source data contains the following two records:

First Record:

```
<?xml version="1.0" encoding="ISO-8859-1" standalone="no" ?>
<XRoot xmlns:xsi="http://www.w3.org/2001/XMLSchema-instance">
  <ORDERS>
    <LINEITEMS>
      <ITEM_ID>7</ITEM_ID>
      <ITEM_DESC>Lawn Mower</ITEM_DESC>
      <AMOUNT>499</AMOUNT>
    </LINEITEMS>
    <LINEITEMS>
      <ITEM_ID>9</ITEM_ID>
      <ITEM_DESC>Bathtub</ITEM_DESC>
      <AMOUNT>899</AMOUNT>
    </LINEITEMS>
    <LINEITEMS>
      <ITEM_ID>14</ITEM_ID>
      <ITEM_DESC>Entry Door</ITEM_DESC>
      <AMOUNT>549</AMOUNT>
    </LINEITEMS>
    <CUSTOMER_ID>1</CUSTOMER_ID>
    <CUSTOMER_NAME>John</CUSTOMER_NAME>
    <ORDER_ID>1</ORDER_ID>
    <ORDER_DATE>2003-11-04</ORDER_DATE>
  </ORDERS>
  <ORDERS>
    <LINEITEMS>
      <ITEM_ID>21</ITEM_ID>
      <ITEM_DESC>Patio Deck</ITEM_DESC>
      <AMOUNT>1049</AMOUNT>
    </LINEITEMS>
    <LINEITEMS>
      <ITEM_ID>17</ITEM_ID>
      <ITEM_DESC>Landscape Lighting</ITEM_DESC>
      <AMOUNT>699</AMOUNT>
    </LINEITEMS>
    <CUSTOMER_ID>2</CUSTOMER_ID>
    <CUSTOMER_NAME>Jack</CUSTOMER_NAME>
    <ORDER_ID>3</ORDER_ID>
    <ORDER_DATE>2003-10-23</ORDER_DATE>
  </ORDERS>
  <ORDERS>
    <LINEITEMS>
      <ITEM_ID>44</ITEM_ID>
      <ITEM_DESC>Steel Kitchen Sink</ITEM_DESC>
      <AMOUNT>1249</AMOUNT>
    </LINEITEMS>
    <LINEITEMS>
      <ITEM_ID>77</ITEM_ID>
      <ITEM_DESC>Platinum Shower Head</ITEM_DESC>
      <AMOUNT>199</AMOUNT>
    </LINEITEMS>
    <CUSTOMER_ID>9</CUSTOMER_ID>
    <CUSTOMER_NAME>Patrick</CUSTOMER_NAME>
```

-continued

```
    <ORDER_ID>4</ORDER_ID>
    <ORDER_DATE>2003-11-23</ORDER_DATE>
  </ORDERS>
</XRoot>
```

Second Record:

```
<?xml version="1.0" encoding="ISO-8859-1" standalone="no" ?>
<XRoot xmlns:xsi="http://www.w3.org/2001/XMLSchema-instance">
  <ORDERS>
    <LINEITEMS>
      <ITEM_ID>92</ITEM_ID>
      <ITEM_DESC>100 Pack Light Bulbs</ITEM_DESC>
      <AMOUNT>49</AMOUNT>
    </LINEITEMS>
    <LINEITEMS>
      <ITEM_ID>74</ITEM_ID>
      <ITEM_DESC>Giant Weed Killer</ITEM_DESC>
      <AMOUNT>19</AMOUNT>
    </LINEITEMS>
    <CUSTOMER_ID>2</CUSTOMER_ID>
    <CUSTOMER_NAME>Jack</CUSTOMER_NAME>
    <ORDER_ID>5</ORDER_ID>
    <ORDER_DATE>2003-11-24</ORDER_DATE>
  </ORDERS>
  <ORDERS>
    <LINEITEMS>
      <ITEM_ID>92</ITEM_ID>
      <ITEM_DESC>Water Purifier</ITEM_DESC>
      <AMOUNT>249</AMOUNT>
    </LINEITEMS>
    <LINEITEMS>
      <ITEM_ID>74</ITEM_ID>
      <ITEM_DESC>20 Gal White Paint</ITEM_DESC>
      <AMOUNT>399</AMOUNT>
    </LINEITEMS>
    <CUSTOMER_ID>11</CUSTOMER_ID>
    <CUSTOMER_NAME>Smith</CUSTOMER_NAME>
    <ORDER_ID>6</ORDER_ID>
    <ORDER_DATE>2003-11-27</ORDER_DATE>
  </ORDERS>
</XRoot>
```

Figure 14:
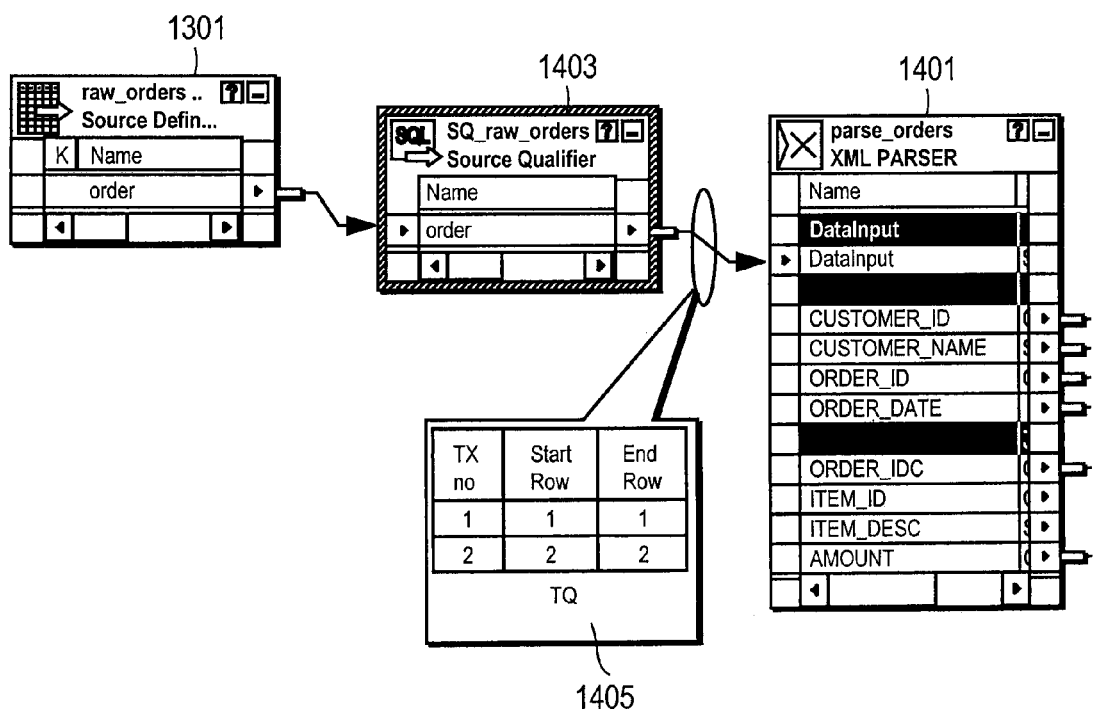
FIG. 14 shows the cascades of transformations for reading and parsing XML document input according to one embodiment.

First, the source data is read and the XML document is parsed using the parse_orders XML parser transformation (1201), referring to FIG. 14. The parsing is done one row at a time, because in this example the source is configured to issue transactions (source-based commits) every single row. Thus, each XML document constitutes a transaction set or data set in this embodiment.

In an alternative embodiment, if the data source is a time-sensitive or real-time data source such as a message queue that is being continuously updated, the parsing transformation may be performed base on time-driven rules or business logic. That is, for example, if each message contains a XML document, and the outstanding messages are being processed at a given time interval (e.g., 10 seconds), the transaction boundaries can be set to be equal to or multiples of the time interval. Note that they are between messages and not within a message—this prevents us from processing a partial message, resulting in partial or incorrect results.

Referring to FIG. 14, SQ_raw_orders (1203) is a transaction generator for setting up transactions. A transaction queue (TQ, 1205) is created that associates with the generator (1203). Given that there are two input records in this example and that the transaction boundaries for commit are at every row, two transaction sets are derived. Hence, the transaction queue (1205) includes two entries. It lists the starting and ending rows of each transaction set.

The parse_orders XML parser transformation (1201) outputs a row for each ORDER and multiple rows of LINEITEM for each order. The LINEITEMs are associated with their corresponding ORDER via the ORDER_ID field.

Since the transformation scope of parse_orders XML parser transformation (1201) is row scope, as mentioned above, the input transactions and the transaction boundaries are propagated onto the output. Because each input row or each XML document constitutes a transaction set, the output of parsing propagates the same boundaries. That is, the transaction boundaries will enclose the results from parsing each XML document. The outputs of parsing are as follows for ORDERS and LINEITEM:

ORDERS

| Row No | Customer_ID | Customer_Name | Order_ID | Order_Date |
|---|---|---|---|---|
| 1 | 1 | John | 1 | 2003-11-04 |
| 2 | 2 | Jack | 2 | 2003-10-23 |
| 3 | 9 | Patrick | 3 | 2003-11-23 |
| | | COMMIT | | |
| 4 | 2 | Jack | 4 | 2003-11-24 |
| 5 | 11 | Smith | 5 | 2003-11-27 |

LINEITEMS

| Row No | Order_ID | Item_ID | Item_Desc | Amount |
|---|---|---|---|---|
| 1 | 1 | 7 | Lawn Mower | 499 |
| 2 | 1 | 9 | Bathtub | 899 |
| 3 | 1 | 14 | Entry Door | 549 |
| 4 | 2 | 21 | Patio Deck | 1049 |
| 5 | 2 | 17 | Landscape Lighting | 699 |
| 6 | 3 | 44 | Steel Kitchen Sink | 1249 |
| 7 | 3 | 77 | Platinum Shower Head | 199 |
| | | COMMIT | | |
| 8 | 4 | 92 | 100 Pack Light Bulbs | 49 |
| 9 | 4 | 74 | Giant Weed Killer | 19 |
| 10 | 5 | 92 | Water Purifier | 249 |
| 11 | 5 | 74 | 20 Gal White Paint | 399 |

Figure 15:
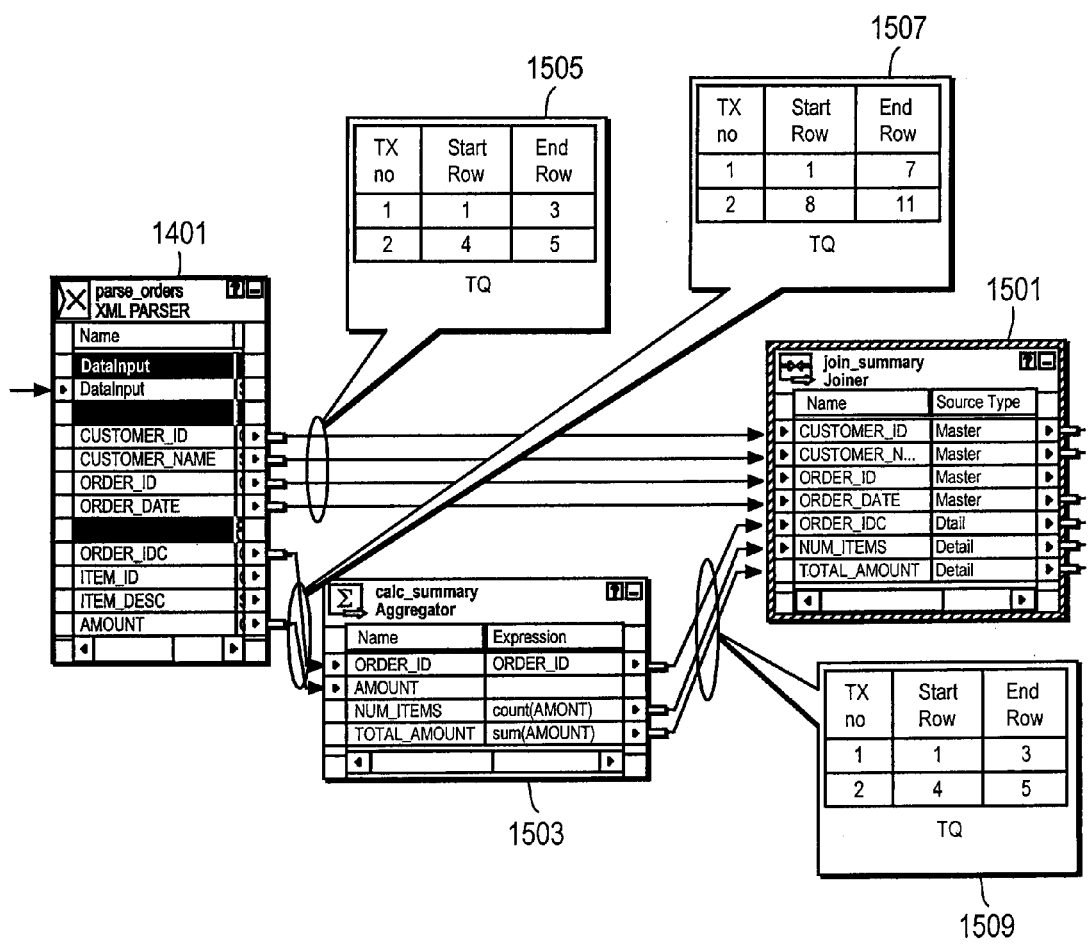
FIG. 15 shows how transaction queues propagate and preserve the transaction boundaries through cascades of transformations according to one embodiment.

Referring to FIG. 15, LINEITEMS is fed to the calc_summary aggregator transformation (1303), which computes the number of items and the total amount in an order. The transformation scope of calc_summary (1303) is set to "transaction" as opposed to "row," and thus the calc_summary transformation (1303) is performed based on transaction sets. It computes the summaries within the transaction boundaries. A transaction queue (1307) is created and maintained, which supports the calc_summary transformation (1303). The transaction queue (1307) set forth the transaction boundaries, i.e., the start and end rows, of the calc_summary transformation (1303). The results from calc_summary are as follows

| Row No | Order_ID | Num_Items | Total_Amount |
|---|---|---|---|
| 1 | 1 | 3 | 1947 |
| 2 | 2 | 2 | 1748 |
| 3 | 3 | 2 | 1448 |
| | | COMMIT | |
| 4 | 4 | 2 | 68 |
| 5 | 5 | 2 | 648 |

The output of ORDER reaches the Master input of the join_summary joiner transformation (1211), referring to FIG. 15.

The summary results are then joined with the orders using the join_summary joiner transformation (1211). The join_summary joiner transformation uses ORDER_ID as the join key. The transformation scope of join_summary is set to "transaction" as opposed to "row," and thus the join_summary transformation is performed based on transaction sets. Two transaction queues (1305, 1309) are created and maintained to support the join_summary transformation (1301), providing the transaction boundaries, i.e., the start and end rows, for each of the two input streams of the joiner.

Figure 18:
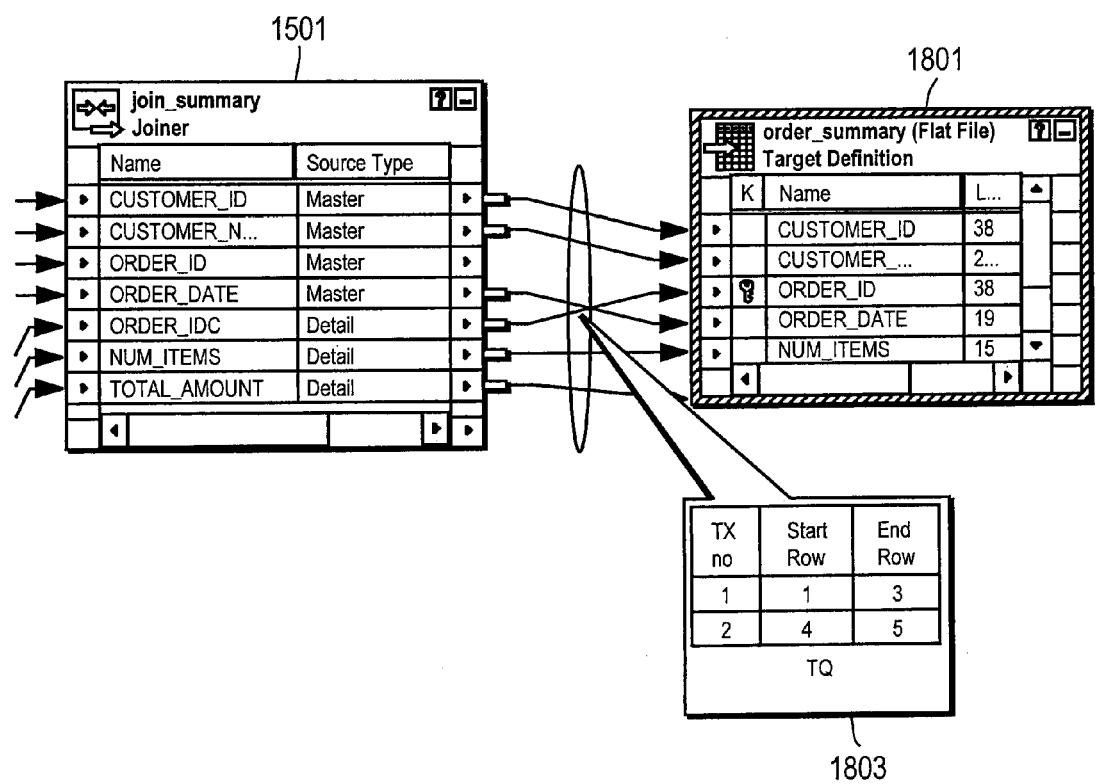
FIG. 18 shows how the results from the join transformation are loaded onto the target according to one embodiment.

Finally, the following results from join_summary (1301) are loaded into the target (1601), as shown in FIG. 18. A transaction queue (1603) is also used to ensure that the transaction boundaries are preserved.

| Row No | Customer_ID | Customer_Name | Order_ID | Order_Date | Num_Items | Total_Amount |
|---|---|---|---|---|---|---|
| 1 | 1 | John | 1 | Nov. 04, 2003 | 3 | 1947 |
| 2 | 2 | Jack | 2 | Oct. 23, 2003 | 2 | 1748 |
| 3 | 9 | Patrick | 3 | Nov. 23, 2003 | 2 | 1448 |
| | | | COMMIT | | | |
| 4 | 2 | Jack | 4 | Nov. 24, 2003 | 2 | 68 |
| 5 | 11 | Smith | 5 | Nov. 27, 2003 | 2 | 648 |

Figure 16:
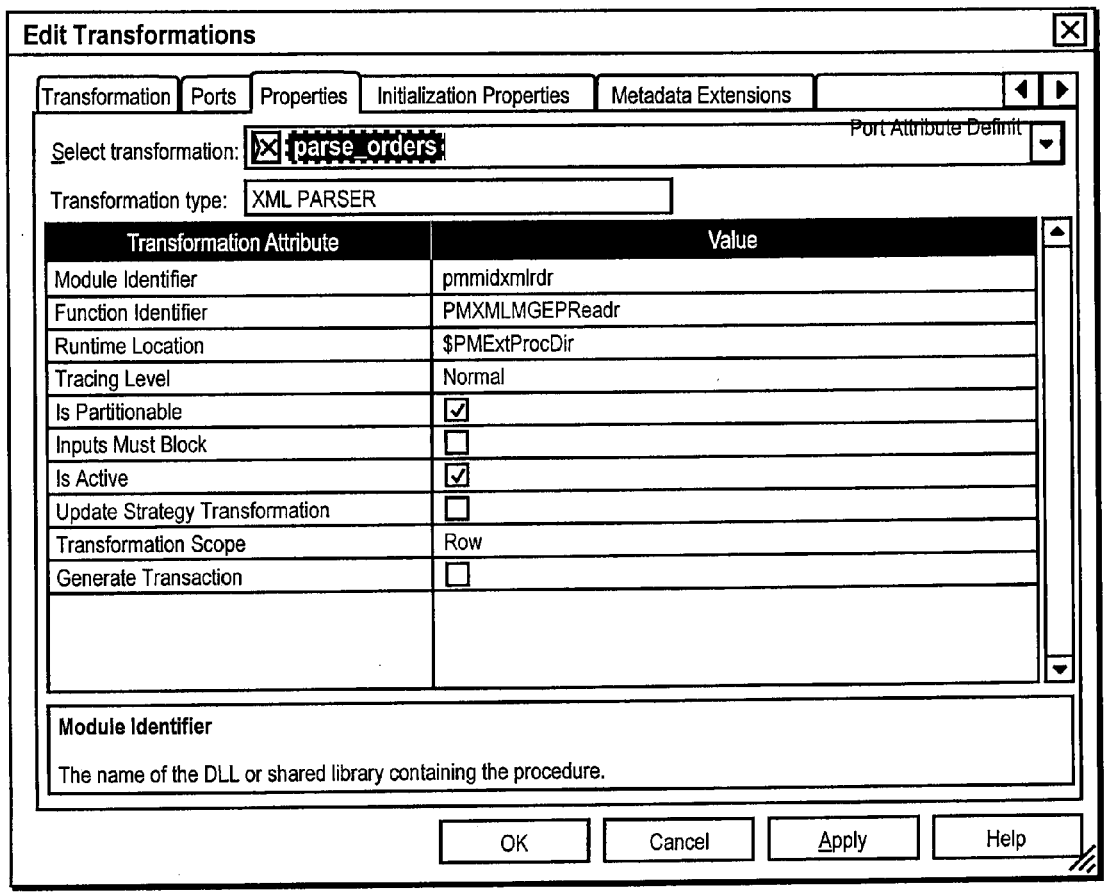
FIG. 16 shows the attributes of the XML parsing transformation according to one embodiment.
Figure 17:
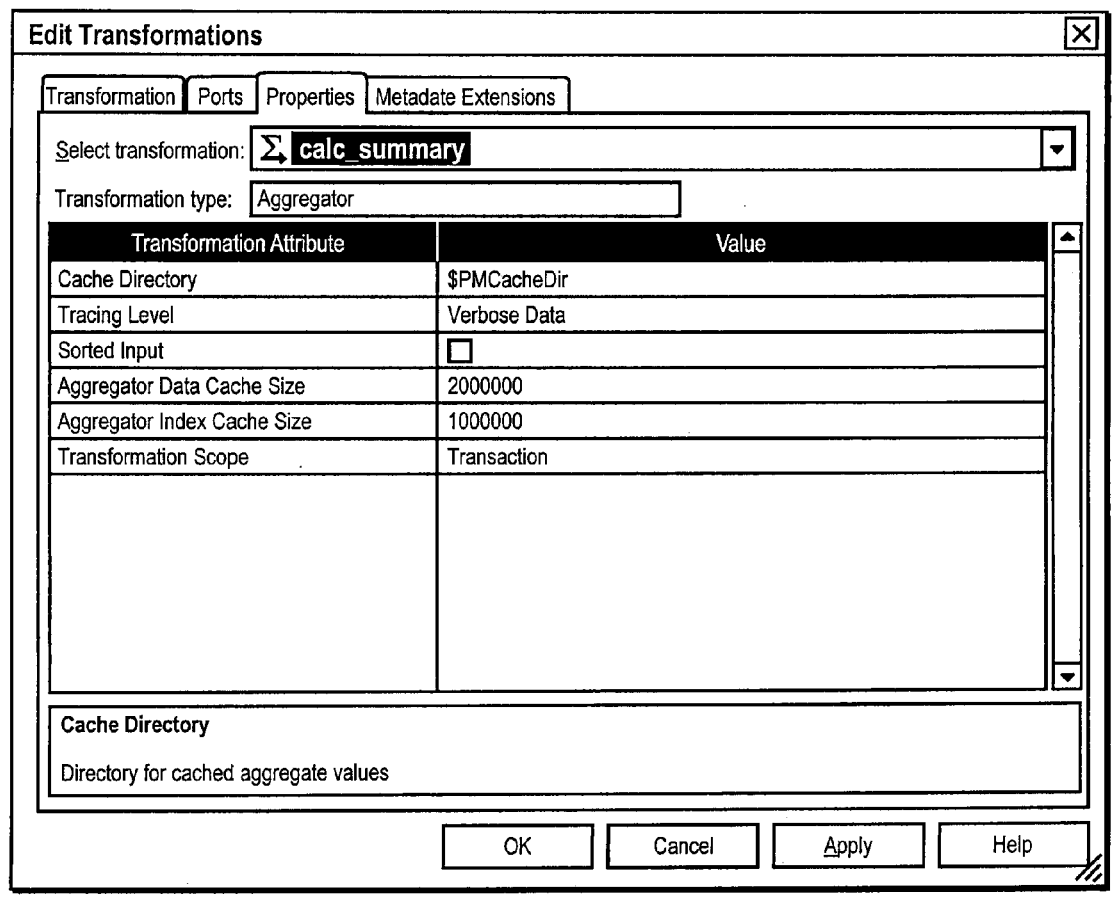
FIG. 17 shows the attributes of the summary aggregator transformation according to one embodiment.
Figure 19:
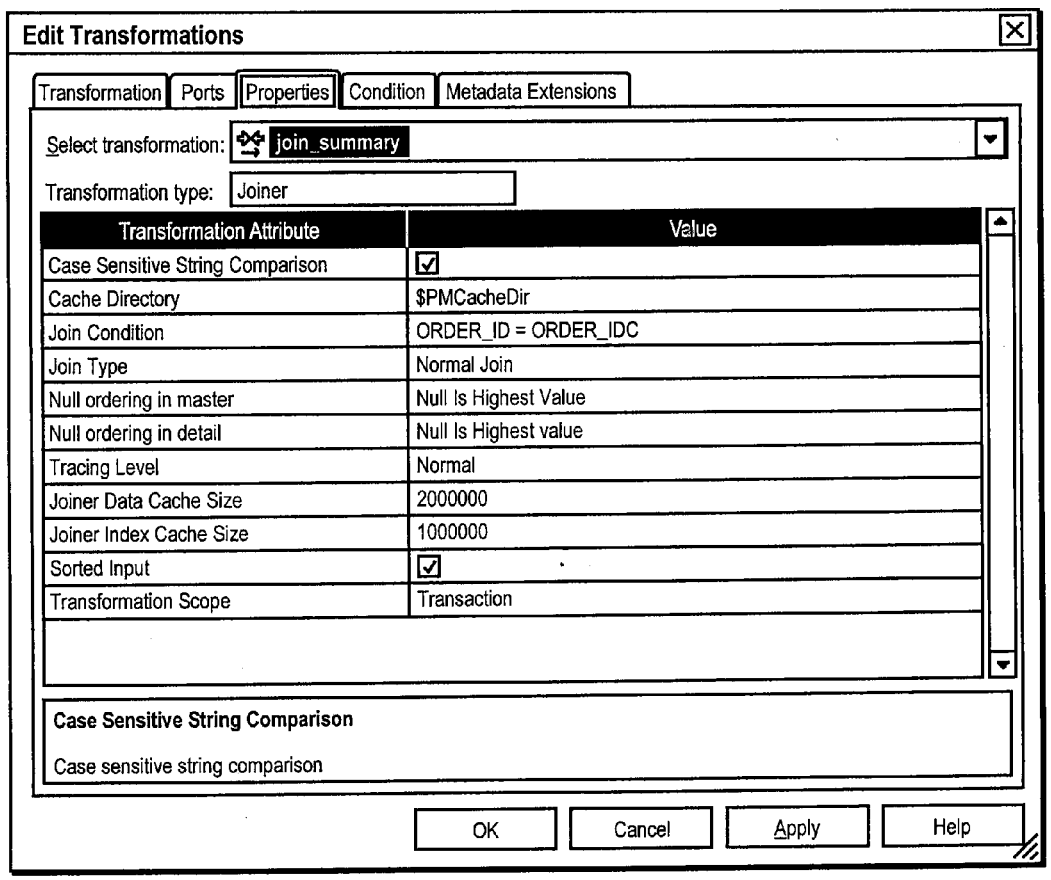
FIG. 19 shows the attributes of a summary join transformation according to one embodiment.

The attributes, scope (set-based or batch-based), and data ports (variables) of the various transformations may be defined by a user through an interface as needed. For example, FIG. 16 shows the attributes of the parse_orders XML parser transformation (1201); FIG. 17 shows the attributes of the calc_summary transformation (1303); and, FIG. 19 shows the attributes of the join_summary transformation (1301).

It is to be understood that the description, specific examples and data, while indicating exemplary embodiments, are given by way of illustration and are no intended to limit the various embodiments of the present disclosure. All references cited herein are specifically incorporated by reference in their entireties. Various changes and modifications within the present disclosure will become apparent to the skilled artisan from the description, examples, and data contained herein, and thus are considered part of the various embodiments of this disclosure.

We claim:

1. A method for processing a plurality of data records, comprising:
   setting transaction boundaries among said plurality of data records thereby dividing the plurality of data records into one or more data sets;
   processing via a database transformation each of the one or more data sets thereby producing a multiplicity of results from the one or more data sets; and
   completing the processing of the plurality of data records by synchronizing the transaction boundaries and combining said multiplicity of results.

2. The method of claim 1, wherein the setting of transaction boundaries is performed based on the row count of the data records.

3. The method of claim 1, wherein the setting of transaction boundaries is performed based on the time stamp of the data records.

4. The method of claim 1, wherein the setting of transaction boundaries is performed based on the result of a previous data transformation.

5. The method of claim 1, wherein the setting of transaction boundaries is performed based on a user-defined logic, wherein the user-defined logic is one or more rules defined by a user.

6. The method of claim 5, wherein the user-defined logic is on a real-time basis.

7. The method of claim 5, wherein the one or more rules are implemented in one or more tables in a database.

8. The method of claim 5, wherein the one or more rules comprise one or more statements defining relationships and actions in a suitable programming language.

9. The method of claim 8, wherein the suitable programming language is one of Generation III Languages (3GL), Generation IV Languages (4GL), and Generation V (5GL) Languages.

10. The method of claim 8, wherein the suitable programming language is an expert system tool.

11. The method of claim 1, wherein said processing comprises at least one of insert, update, delete, aggregation, rank, sort, sequence, and join.

12. A method for performing a series of transformations on a plurality of data records, wherein said series of transformations initiate at a source and conclude at a target, said method comprises:
   setting transaction boundaries among said plurality of data records at said source thereby dividing the plurality of data records into one or more data sets;
   propagating the transaction boundaries through the series of transformations from the source to the target;
   performing said series of transformations based on the one or more data sets thereby producing a multiplicity of results from said series of transformations; and
   completing the series of transformations by synchronizing the transaction boundaries and combining said multiplicity of results.

13. The method of claim 12, wherein the setting of transaction boundaries is performed based on the row count of the data records.

14. The method of claim 12, wherein the setting of transaction boundaries is performed based on the time stamp of the data records.

15. The method of claim 12, wherein the setting of transaction boundaries is performed based on the result of a previous data transformation.

16. The method of claim 12, wherein the setting of transaction boundaries is performed based on a user-defined logic, wherein the user-defined logic is one or more rules defined by a user.

17. The method of claim 16, wherein the user-defined logic is on a real-time basis.

18. The method of claim 16, wherein the one or more rules are implemented in one or more tables in a database.

19. The method of claim 16, wherein the one or more rules comprise one or more statements defining relationships and actions in a suitable programming language.

20. The method of claim 19, wherein the suitable programming language is one of Generation III Languages (3GL), Generation IV Languages (4GL), and Generation V Languages (5GL).

21. The method of claim 19, wherein the suitable programming language is an expert system tool.

22. The method of claim 12, wherein the propagating comprises setting and maintaining one or more transaction queues capable of defining the boundaries of the data sets.

23. The method of claim 22, wherein the transaction queues comprise one or more tables in a database.

24. The method of claim 22, wherein said transaction queues are maintained in a computer memory.

25. The method of claim 12, wherein said series of transformations comprise at least one of insert, update, delete, aggregation, rank, sort, sequence, and join.

26. A system for processing a plurality of data records, comprising:
   means for setting transaction boundaries among said plurality of data records thereby dividing the plurality of data records into one or more data sets;
   means for processing via a database transformation each of said one or more data sets thereby producing a multiplicity of results from the one or more data sets; and
   means for synchronizing the transaction boundaries and combining said multiplicity of results thereby completing said processing.

27. The system of claim 26, wherein the means for setting transaction boundaries defines the transaction boundaries based on the row count of the data records.

28. The system of claim 26, wherein the means for setting transaction boundaries defines the transaction boundaries based on the time stamp of the data records.

29. The system of claim 26, wherein the means for setting transaction boundaries defines the transaction boundaries based on the result of a previous data transformation.

30. The system of claim 26, the means for setting transaction boundaries comprises defines the transaction boundaries based on a user-defined logic, wherein the user-defined logic is one or more rules defined by a user.

31. The system of claim 30, wherein the user-defined logic is on a real-time basis.

32. The system of claim 30, wherein the one or more rules are implemented in one or more tables in a database.

33. The system of claim 30, wherein the one or more rules comprise one or more statements defining relationships and actions in a suitable programming language.

34. The system of claim 33, wherein the suitable programming language is one of Generation III Languages (3GL), Generation IV Languages (4GL), and Generation V Languages (5GL).

35. The system of claim 33, wherein the suitable programming language is an expert system tool.

36. The system of claim 26, wherein said processing comprises at least one of insert, update, delete, aggregation, rank, sort, sequence, and join.

37. A system for performing a series of transformations on a plurality of data records, wherein said series of transformations initiate at a source and conclude at a target, said system comprises:
 means for setting transaction boundaries among said plurality of data records at the source thereby dividing the plurality of data records into one or more data sets;
 means for propagating the transaction boundaries through the series of transformations from the source to the target;
 means for performing said series of transformations based on the one or more data sets thereby producing a multiplicity of results from said series of transformations; and
 means for synchronizing the transaction boundaries and combining the multiplicity of results thereby completing the series of transformations.

38. The system of claim 37, wherein the means for setting transaction boundaries defines the transaction boundaries based on the row count of the data records.

39. The system of claim 38, the means for setting transaction boundaries defines the transaction boundaries based on a user-defined logic, wherein the user-defined logic is one or more rules defined by a user.

40. The system of claim 39, wherein the user-defined logic is on a real-time basis.

41. The system of claim 39, wherein the one or more rules are implemented in one or more tables in a database.

42. The system of claim 39, wherein the one or more rules comprise one or more statements defining relationships and actions in a suitable programming language.

43. The system of claim 42, wherein the suitable programming language is one of Generation III Languages (3GL), Generation IV Languages (4GL), and Generation V Languages (5GL).

44. The system of claim 42, wherein the suitable programming language is an expert system tool.

45. The system of claim 37, wherein the means for setting transaction boundaries defines the transaction boundaries based on the time stamp of the data records.

46. The system of claim 37, wherein the means for setting transaction boundaries defines the transaction boundaries based on the result of a previous data transformation.

47. The system of claim 37, wherein the means for propagating the transaction boundaries comprises setting and maintaining one or more transaction queues capable of defining the boundaries of the data sets.

48. The system of claim 47, wherein said transaction queues comprise one or more tables in a database.

49. The system of claim 47, wherein said transaction queues are maintained in a computer memory.

50. The system of claim 37, wherein said series of transformations comprise at least one of insert, update, delete, aggregation, rank, sort, sequence, and join.

51. A computer readable medium having recorded thereon program instructions which when processed by a computer are capable of executing a method for processing a plurality of data records, said method comprising:
 setting transaction boundaries among said plurality of data records thereby dividing the plurality of data records into one or more data sets;
 processing via a database transformation each of said one or more data sets thereby producing a multiplicity of results from the one or more data sets; and
 completing the processing of said plurality by synchronizing the transaction boundaries and combining said multiplicity of results.

52. A computer readable medium having recorded thereon program instructions which when processed by a computer are capable of executing a method for performing a series of transformations on a plurality of data records, said method comprising:
 setting transaction boundaries among said plurality of data records thereby dividing the plurality of data records into one or more data sets;
 propagating the transaction boundaries through said series of transformations;
 performing said series of transformations based on the one or more data sets thereby producing a multiplicity of results from said series of transformations; and
 completing the series of transformations by synchronizing the transaction boundaries and combining said multiplicity of results.

* * * * *